US007120757B2

(12) United States Patent
Tsuge

(10) Patent No.: US 7,120,757 B2
(45) Date of Patent: Oct. 10, 2006

(54) STORAGE MANAGEMENT INTEGRATED SYSTEM AND STORAGE CONTROL METHOD FOR STORAGE MANAGEMENT INTEGRATED SYSTEM

(75) Inventor: Munetoshi Tsuge, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 251 days.

(21) Appl. No.: 10/085,036

(22) Filed: Mar. 1, 2002

(65) Prior Publication Data

US 2003/0163652 A1 Aug. 28, 2003

(30) Foreign Application Priority Data

Feb. 26, 2002 (JP) .............................. 2002-049308

(51) Int. Cl.
*G06F 12/00* (2006.01)
(52) U.S. Cl. .................. 711/147; 711/154; 709/215
(58) Field of Classification Search .................... 707/3, 707/103 X, 205; 709/218, 213; 711/147, 711/151, 154
See application file for complete search history.

(56) References Cited

U.S. PATENT DOCUMENTS 6,366,907 B1 * 4/2002 Fanning et al. ................ 707/3
2002/0188735 A1 * 12/2002 Needham et al. ........... 709/229

OTHER PUBLICATIONS

Beverly Yang et al, Comparing Hybrid Peer-to-Peer Systems, Proceedings of the 27th VLDB Conference, Roma, Italy, 2001.*
Intel Corporation, P2P File-Sharing at Work in the Enterprise, White Paper, Mar. 2001.*
Michael Rabinovich et al, Not All Hits Are Created Equal: Cooperative Proxy Caching Over a Wide-Are Network, 3rd International WWW Caching Workshop, Manchester, England, 1998.*
IBM Corporation, Logical Data Interface, IBM Technical Disclosure Bulletin, vol. 16, No. 4, Sep. 1973, pp. 1203-1207.*
Nathan J. Muller, Desktop Encyclopedia of the Internet, Artech House Inc., 1999, pp. 355-357.*
Bruce Walker et al, "The LOCUS Distributed Operating System", Proceedings of the Ninth Symposium on Operationg Systems Principles, ACM Press, 1983, pp. 49-70.*

* cited by examiner

*Primary Examiner*—Pierre M. Vital
(74) *Attorney, Agent, or Firm*—Mattingly, Stanger, Malur & Brundidge, P.C.

(57) ABSTRACT

It is intended to achieve an arrangement wherein, when file information of shared disks which are distributed in a plurality of computers connected to a network are used, operating conditions at the time of accessing shared disks can be defined, thus enabling users to easily share files without being bothered by setting-up, or operations of computers located on the other side when they are to perform file sharing.

In order to achieve the above-stated arrangement, a storage management integrated server 100 is provided in a network, and respective computers register conditions, an accessibility states and use types pertaining to shared volume to be offered to the server. Thereafter, when a certain computer is to make a file accessing to a shared volume, the computer makes an inquiry to the storage management integrated server for an adequate access destination, determines, on the basis of a response from the server, computers which are suitable to the access source, and makes direct accesses to such computers.

20 Claims, 17 Drawing Sheets

FIG. 4

| COMPUTER ID | IP ADDRESS | POLICY INFORMATION ||||| AVAILABLE SPACE | ACCESSI-BILITY STATE |
|---|---|---|---|---|---|---|---|---|
| | | TYPE | TOTAL SPACE | AVAILABLE TIME ZONE | PRIORITY OF SELECTION | ---- | | |
| | | | | | | | | |
| | | | | | | | | |
| | | | | | | | | |

Figure 6:
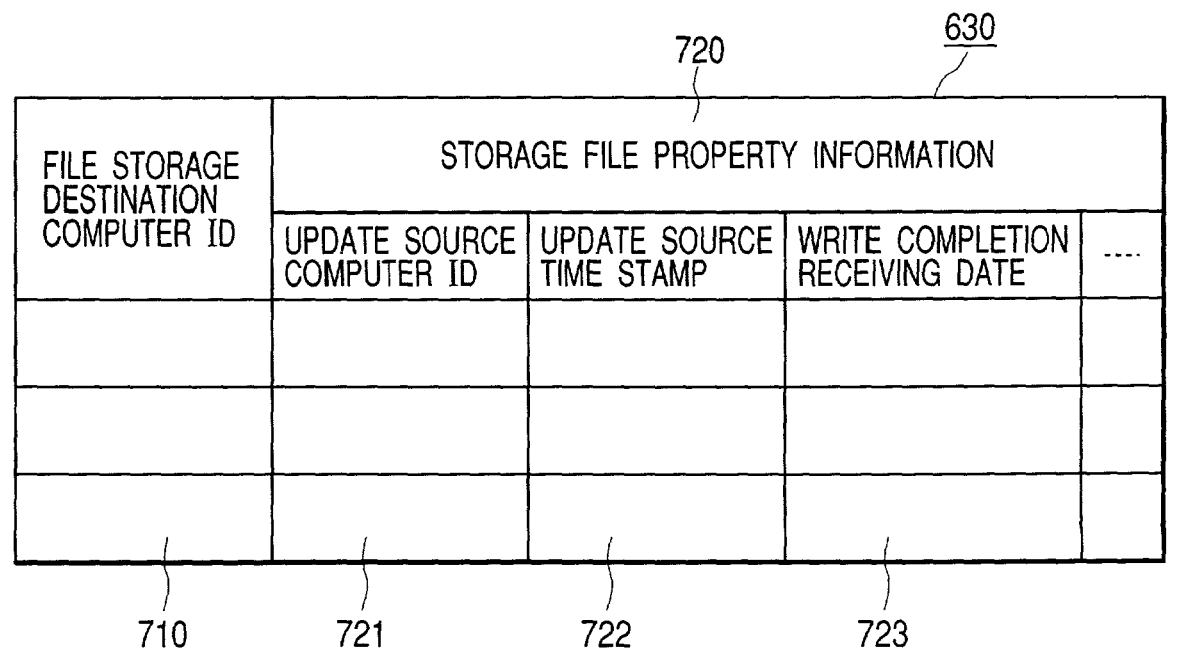

| FILE STORAGE DESTINATION COMPUTER ID | STORAGE FILE PROPERTY INFORMATION | | | |
|---|---|---|---|---|
| | UPDATE SOURCE COMPUTER ID | UPDATE SOURCE TIME STAMP | WRITE COMPLETION RECEIVING DATE | .... |
| | | | | |
| | | | | |
| | | | | |

STORAGE MANAGEMENT INTEGRATED SYSTEM AND STORAGE CONTROL METHOD FOR STORAGE MANAGEMENT INTEGRATED SYSTEM

BACKGROUND OF THE INVENTION

The present invention relates to a storage management integrated system and a storage control method for the storage management integrated system, and more specifically to a storage management integrated system and a storage control method for the storage management integrated system which are suitable to improve the convenience in sharing files of users by offering the centralized managing of file information of shared disks in a plurality of computers that are connected to a network, thus enabling the sharing of files depending on the status of the computers and the disks.

In recent years, the higher capacity is being aggressively pursued in the design of a hard disk, which in turn has accelerated a trend of mounting very large capacity of hard disks even for personal computers that can be possessed and used by each individual user. On the other hand, however, not a many application software that are capable of effectively utilizing such a large-capacity hard disk mounted in those personal computers are available at present. Though not for this reason, even if the capacity of a hard disk is reduced, the price for a personal computer will not be lowered as anticipated since hard disk units are so designed that no big difference should occur among their prices where the hard disk quality exceeds a certain level. Consequently, it is true that many of recent personal computers leave considerable surplus space in their hard disks.

An effective method to utilize such surplus space may be, for example, to use the surplus space for sharing files by a plurality of persons or backing up files, by designating such surplus space to be a shared disk volume that can be accessed from other computers connected to a network, using a protocol which enables access to files via the network.

However, since such surplus space exists in a small volume in each computer, it may become uncertain which files are recorded in which shared disk volume, unless the file location management is skillfully achieved, regarding such as which file exists in which shared disk volume of a computer, or what file is to be written in. Conventionally, the file management had to be conducted by users themselves who are making access to the shared disk volume.

Further, with a conventional disk sharing technology, a primary user of a computer's side that offers the shared disk volume could not provide a user who uses the shared disk volume with information concerning operating conditions regarding how the disk volume should be used, or how the disk volume should be preferably used.

In addition, a hard disk that is incorporated in a personal computer is not reliable enough, there is no guarantee that the personal computer is always turned on, and furthermore, when it comes down to a notebook type computer or a personal digital assistance (PDA), it is not always connected to a network. In a case where the shared disk volume provided by such computers is used, conventionally, users themselves who are accessing the disk volume had to consider factors that are arising out of operations at their own will.

On the other hand, in recent years, an NAS (Network Attached Storage) has been attracting people's attention as exclusive shared disk equipment that can be directly connected to a network. The deployment of the NAS equipment includes the following advantage: the centralized management of data is possible if shared disks can be concentrated on one NAS equipment; many of the NAS equipment offer higher reliability and higher accessing speeds than hard disks that are employed by personal computers; and system management functions such as backing up of files, etc. are abundant and can be operated easily. However, in addition to the fact that NAS equipment are expensive in general, there is a disadvantage that the NAS equipment themselves or the surrounding networks will incur increased loads when the equipment is shared by many people. Further, it could be an another disadvantage that, when all shared files are concentrated into one NAS equipment, no access might be possible to any one of the files if a problem occurs in the NAS equipment itself or on the network connecting the NAS equipment and an access source computer. Though not for this reason, if plural pieces of NAS equipment are deployed so as to secure redundancy, both the deployment and the management cost will increase, thereby deteriorating the convenience of the centralized management in turn.

A problem for a case where the shared disk volume provided by a plurality of computers connected each other via a network is used may be, for example as described above, that the management of file location, and operating conditions, accessibility state, and use type of a computer of a person who is at a side which offers the shared disk volume should be reflected on file access.

As the prior art to dissolve problems concerning the location management of files that exist over a plurality of shared disk volume, a peer-to-peer (P2P) file exchange system such as Napster or Gnutella is known. However, since this system is one designed to disclose files that have been already written in the shared disk volume arranged in respective computers to other computers, this system cannot deal with file-writing operations from other computers, and much less, a user who provides the shared disk volume can offer information on writing conditions, etc.

Further, another system that manages shared disks under a certain use condition is available as the prior art. However, this system has been designed for a specified manager to make a centralized management of a group of disks that are used exclusively for shared disks, and therefore, in terms of such shared disk volumes where respective shared disks have different users and are installed in computers whose use type and an accessibility state are different from each other, it does not reflect use type, an accessibility state, and operating conditions of the computer.

On the other hand, although the NAS equipment has advantages and disadvantages such as the centralized management of data, the high reliability, concentrated access and high prices, which are different from a case to utilize shared disk volumes provided by a plurality of computers, there have been no prior arts to complement mutual disadvantages by combining the both systems.

SUMMARY OF THE INVENTION

In view of the foregoing, the present invention has been made, and the present invention provides a storage management integrated system and a storage control method for the storage management integrated system capable of providing a centralized management of file information of shared disks that are distributed to a plurality of computers connected to a network, in which the file sharing can be easily performed without making users bother in setting-up or operations of computers located on the other side when they are to make an arrangement to define operating conditions in accessing to the shared disks and are to perform file sharing.

Furthermore, this invention provides a storage management integrated system and a storage control method for the storage management integrated system, wherein throughput will not be deteriorated even access is made to a computer which could be a bottleneck of a network.

With the present invention, one or more storage management integrated servers are arranged on a network, and each individual computer registers policy information for a shared disk volume to be provided, information on use type of the computer, etc. to the storage management integrated servers. In addition, the storage management integrated servers monitor the accessibility state of respective computers on a regular basis.

In the storage management integrated servers, location information of files which are also recorded in the shared disk volumes provided by respective computers are also stored, in addition to other information such as policies, use type and an accessibility state of respective computers. When a certain computer is to access a file in a shared disk volume, the computer will first make an inquiry to the storage management integrated server for an adequate access destination.

Then, the storage management integrated server creates, based on above-described information that are stored within the server, a list of computers which are suitable for access destinations, and responds to an inquiry source computer with the list. The inquiry source computer selects computers on the list which are desirable for access destination computers, and make access directly to those computers. Upon the normal completion of file access, the access destination computers report change information on file locations that have arisen as a result of making access to the storage management integrated server. The storage management integrated server reflects the file location change information, thus obtained, on file location information that are available within the server.

Functions of the storage management integrated server are limited only to keeping track of information on file locations, policies of respective computers, etc., and also to making inquiries as to adequate computers for access destination of files, and they do not store contents of files within the storage management integrated server, nor relay those data when accessing is made to the file contents. Consequently, a protocol which is used in practically making access to file contents can be any protocols so far as some requirements such as making a notification to the storage management integrated server at the time of the start/end of writing or executing a deletion are satisfied. Furthermore, even in a case where the storage management integrated server has become inoperative, direct accessing to files is possible among computers once file locations can be identified.

Although it is so designed that the storage management integrated server which has accepted an inquiry from a computer for access destinations returns a list of computers which are suitable to access destinations in responding to the inquiry from the computer, the computer which received the list may make access concerning the same files to a plurality of computers stated on the list. By performing a writing of the same file to a plurality of computers, even in a case where a certain computer is in a halt or has been disconnected from a network, it will be possible to read files that are recorded in the other computer. In addition, by reading the same file from a plurality of computers, it will become possible to read files that best fit the requirements of the access source computer from access destination computer (which has, for example, the fastest network line speed). With such an arrangement, the throughput speed in reading files can be improved.

In a case where NAS equipment is installed within an integrated system, according to the present invention, of auxiliary storage owned by a plurality of computers and all shared files are subjected to a centralized management in the NAS equipment, also the NAS equipment performs the registration of policy information, etc. to the storage management integrated server as is the case with other computers. At this time, in inquiries for all writing destinations of files, by arranging policy information so that the NAS equipment can be selected for a write destination computer, all the shared files can be written in the NAS equipment except for a case where the write source computer allows itself to reject writing files in the NAS equipment. Furthermore, when the file writing to a plurality of computers as described above is used together, the files can be read out from computers other than the NAS equipment. Therefore, by taking such an arrangement, it is possible to reduce loads to be incurred by the NAS equipment or peripheral networks.

If loads to be incurred by the NAS equipment or the peripheral networks are subjected to increase only with writing files, a proxy access computer is arranged between the NAS equipment and the access source computer, and thus, to write files in the NAS equipment in a case where the files will be written to the proxy access computer. The proxy access computer writes the files that are written into it by other computers to the NAS equipment on behalf of the real root of the access source computer. By taking such arrangement, the write source computer can be released earlier from the file writing processing, and therefore, the problem of network loads is expected to be improved.

In addition, by providing the storage management integrated server with a coordinating function to enable the delivery of inquiries for access computers between the storage management integrated servers, it is possible to deal with the file management for a larger-scale network.

As described above, the use of the storage management integrated system according to the present invention to achieve an integrated management of shared disk volumes provided by respective computers available on a network including the NAS equipment by using a storage management integrated server enables a user to perform file accessing without being aware of which shared disk volume the user is now accessing. Furthermore, by applying adequate policy information at the time of selecting file access destination computers, it becomes possible to realize a reduction in the load of the NAS equipment while achieving the centralized management of shared files by using the NAS equipment, or the selection of access destinations according to characteristics of respective computers regarding whether or not the computers are designed for mobile applications.

BRIEF DESCRIPTION OF SEVERAL VIEWS OF DRAWING

FIG. 4 is a configuration diagram showing a form of a computer policy table 321;

FIG. 6 is a configuration diagram showing a form of a file location table 630;

Figure 16:
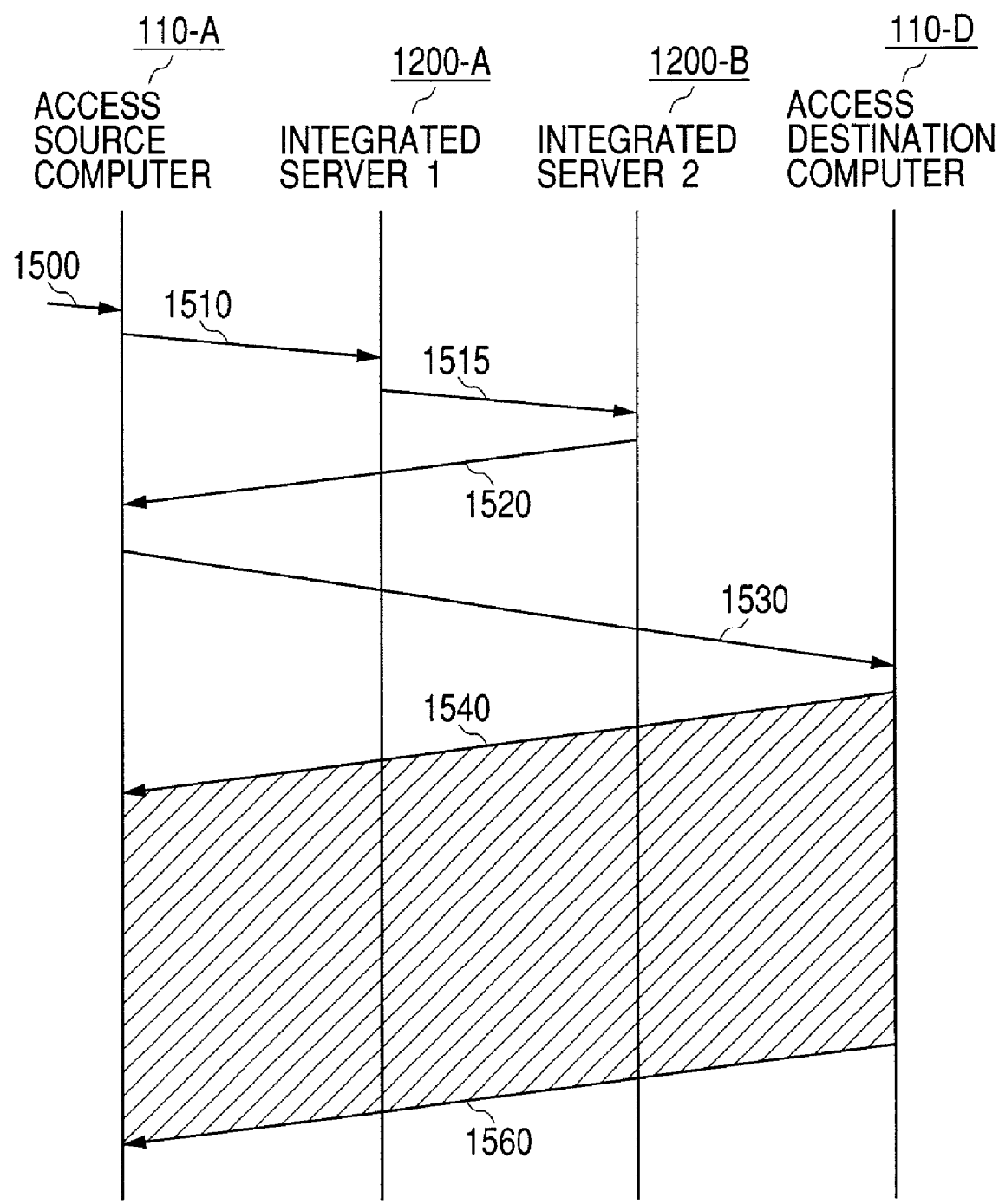
Figure 17:
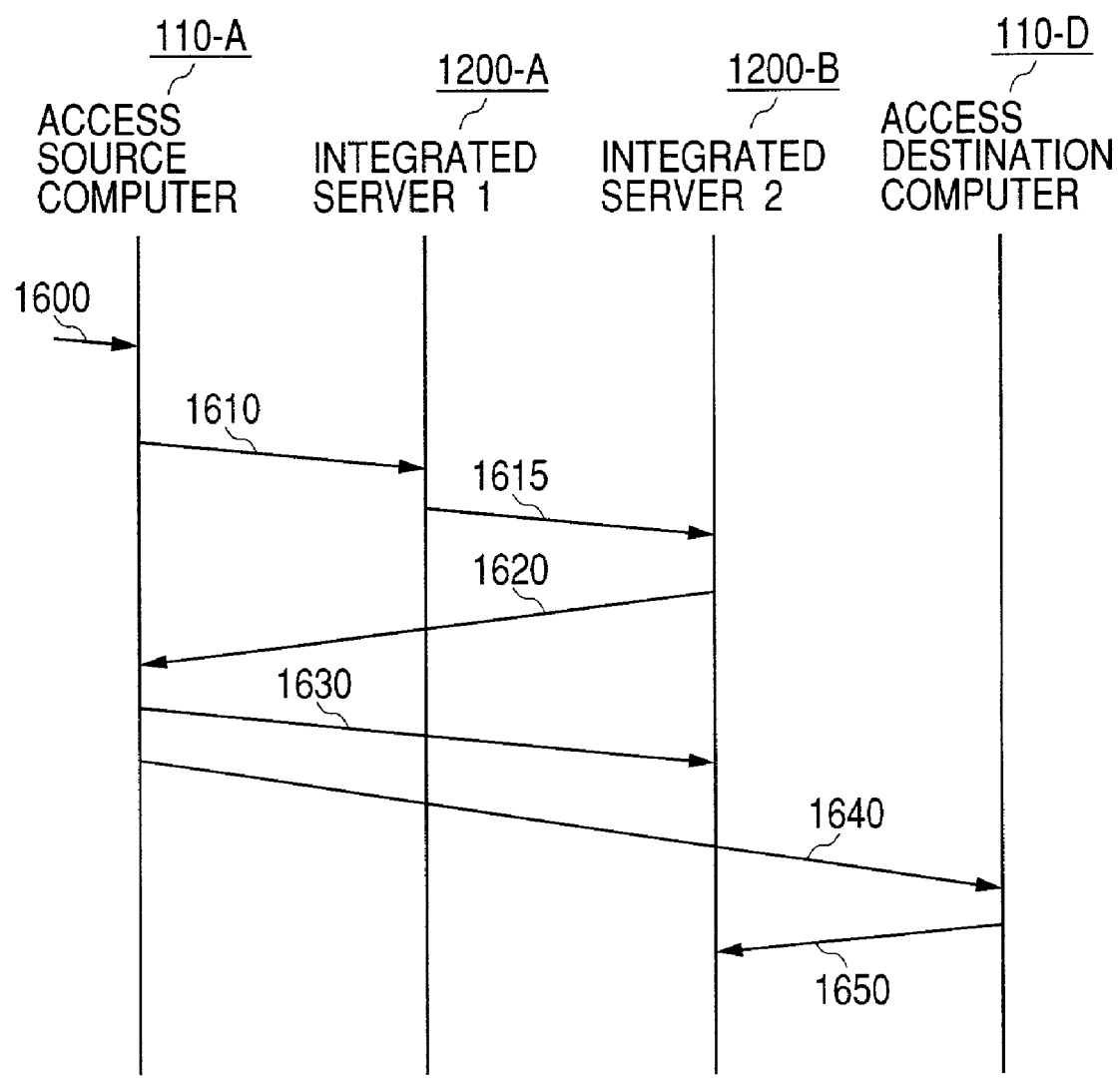

FIG. 16 is a sequence diagram showing system operations at the time when a computer 110 reads a file from auxiliary storage of other computers by utilizing an integrated server that has a mutual coordinating function; and FIG. 17 is a sequence diagram showing system operations at the time when a computer 110 deletes a file stored in auxiliary storage of other computers by utilizing an integrated server that has a mutual coordinating function.

DETAILED DESCRIPTION OF THE INVENTION

Preferred embodiments of the present invention will be described in detail below with reference to FIGS. 1 to 16.

[First Embodiment]

A first embodiment of the present invention will now be described in detail with reference to FIGS. 1 to 9.

(I) Configuration of Storage Management Integrated System

First, referring to FIG. 1, a configuration of a storage management integrated system according to the first embodiment of the present invention will now be described.

Figure 1:
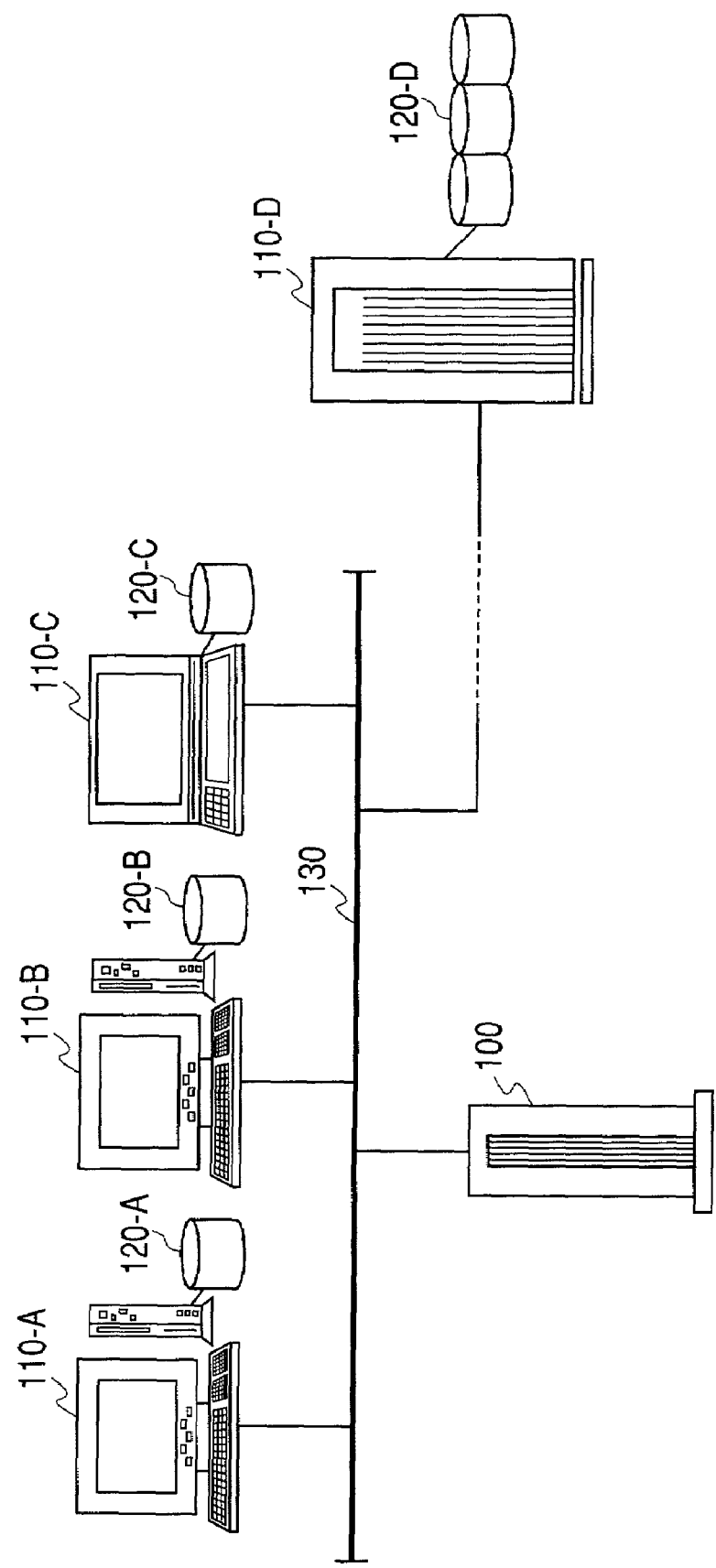
FIG. 1 is a system configuration diagram of a storage management integrated system according to a first embodiment of the present invention.

FIG. 1 is a system configuration diagram of a storage management integrated system according to the first embodiment of the present invention.

The storage management integrated system according to the first embodiment of the present invention comprises a storage management integrated server 100 (hereinafter referred to simply as "integrated server"), and a plurality of computers 110 each having an auxiliary storage 120, both of which are connected to each other via a network 130.

The integrated server 100 and the computers 110 register exchange message, by executing communication via the network 130, such as a registration of a policy which is applied at the time when the auxiliary storage 120 owned by a computer 110 is to be used by other computers 110, make an inquiry, at the time when a computer 110 is making access to a certain file, to know which auxiliary storage 120 owned by other computers 110 is most adequate to make access to and make a reply for the inquiry, and exchange of messages such as a file access completion notification to an auxiliary storage 120 owned by the computer 110. Between a computer 110 and another computer 110, file accessing will be executed from a computer 110 to auxiliary storage 120 owned by other computers 110, by making communication through the network 130. Therefore, in order to clarify this fact, a computer shall also be referred to as an "access computer" in the present specification.

It should be noted that, although the figures according to the first embodiment illustrate the fact that the integrated server 100 and all computers 110 are connected to one network segment, the present invention can also be applied to a case where the integrated server 100 and all computers 110 are not included in the same network segment if the present invention is applied to a network that allows the mutual communication on a network layer where an IP protocol is used. In addition, with the first embodiment, it shall be arranged that the integrated server 100 and all computers 110 will communicate by using an IP protocol. However, it shall be understood that the present invention may be implemented if mutual communication is possible between the integrated server 100 and any one of computers 100, and between any two computers 100 as well, by using a different protocol.

(II) Configuration of Integrated Server

Next, referring to FIGS. 2 and 3, a configuration of a storage management integrated system according to the first embodiment of the present invention will now be described.

Figure 2:
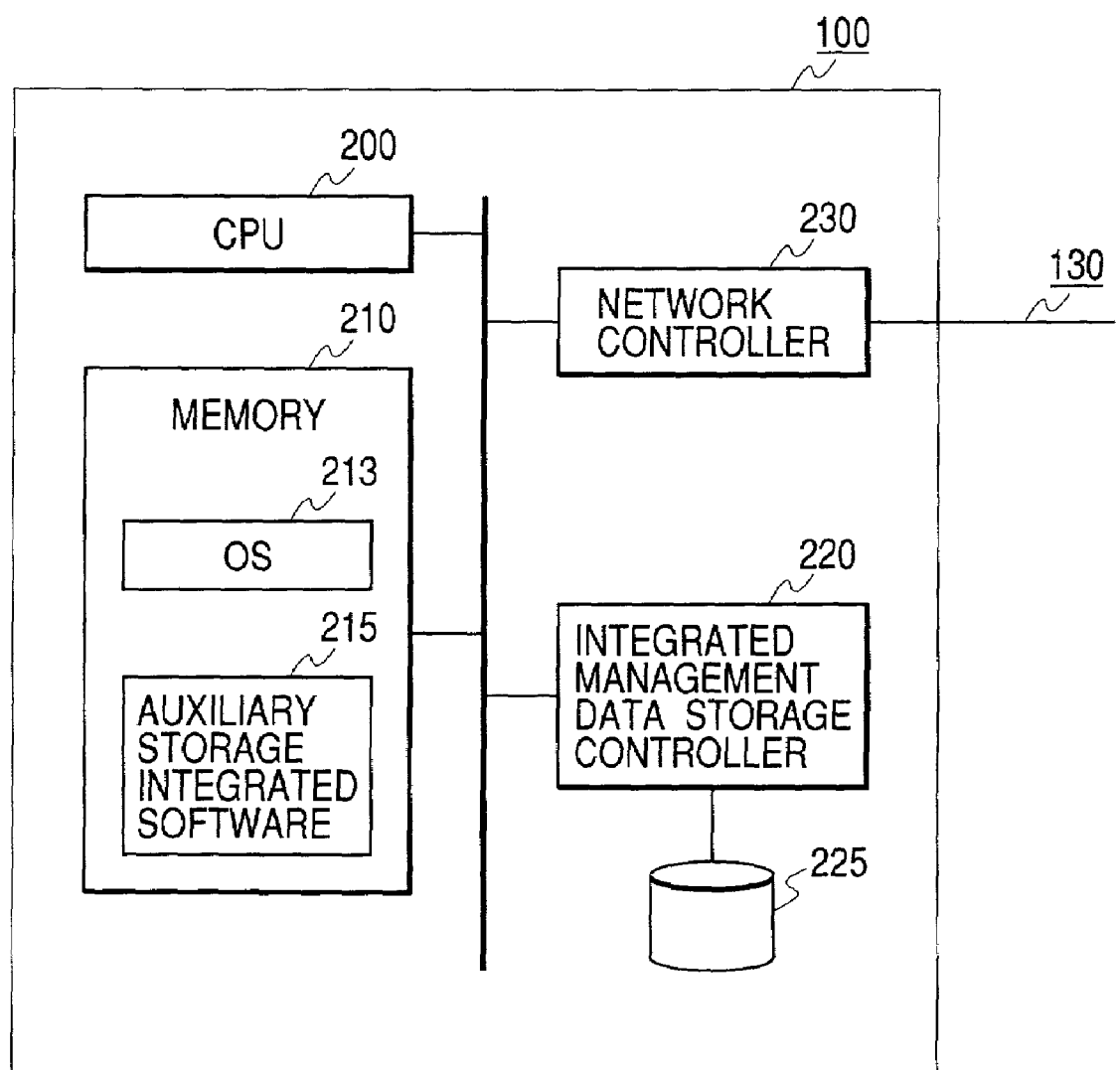
FIG. 2 is a hardware configuration diagram of an integrated server 100 according to the first embodiment of the present invention.

FIG. 2 is a hardware configuration diagram of an integrated server 100 according to the first embodiment of the present invention.

Figure 3:
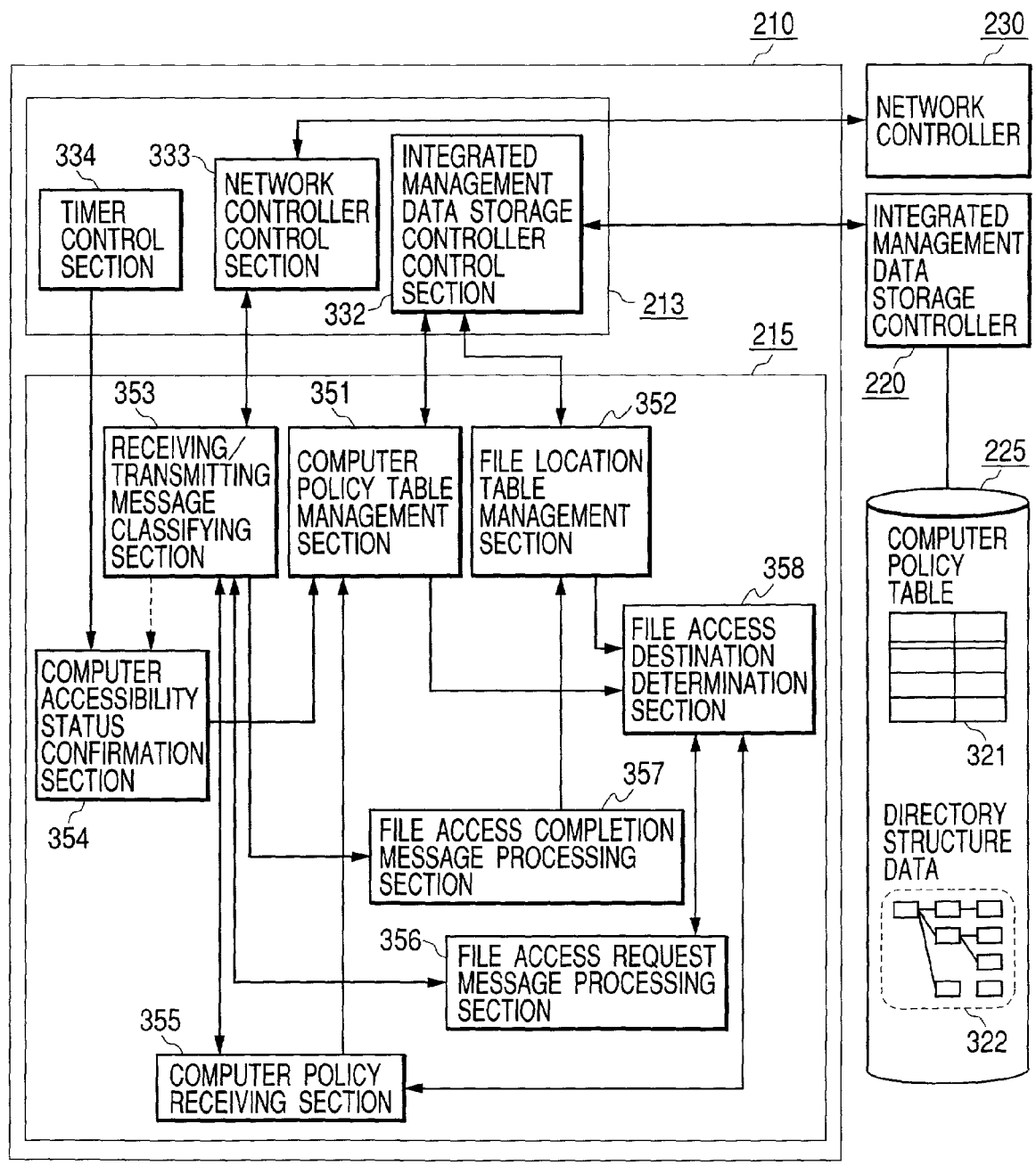
FIG. 3 is a configuration diagram illustrating programs for respective functions to be arranged in a memory 210 and data to be stored in an integrated management data storage 225 according to the first embodiment of the present invention.

FIG. 3 is a configuration diagram illustrating programs for respective functions to be arranged in a memory 210 and data to be stored in integrated management data storage 225 according to the first embodiment of the present invention.

A CPU (Central Processing Unit) 200 shown in FIG. 2 is a processor to execute a program stored in a memory 210. In the memory 210, an OS 213 which controls the entire system, and storage management integrated software 215 which offers the integrated management of auxiliary storage 120 owned by a plurality of computers 110 are stored.

A network controller 230 controls communication with computers 110 on a network. In integrated management data storage 225, data such as a table to be used by the storage management integrated software 215 while it is running are recorded. An integrated management data storage controller 220 controls inputs to and outputs from the integrated management data storage 225.

As shown in FIG. 3, the integrated management data storage 225 stores two pieces of data, namely, a computer policy table 321 and directory structure data 322. Accessing to those data is performed by the storage management integrated software 215 via the OS 213.

In the memory 210, the OS 213, the storage management integrated software 215, and other necessary software are stored. Specifically, a program of OS 213 incorporates several modules such as a timer control section 334, a network controller control section 333 and an integrated management data storage controller control section 332.

The timer control section 334 is a module for invoking a regular process in the storage management integrated software 215. The network controller control section 333 is a module for directly operating the network controller 230 and execute communication with computers 110. The integrated management data storage controller control section 332 is a module for directly operating the integrated management data storage controller 220 and execute read/write of data between the section 332 and the integrated management data storage 225.

The storage management integrated software 215 comprises modules such as a computer policy table management section 351, a file location table management section 352, a receiving/transmitting message classifying section 353, a computer accessibility status confirmation section 354, a computer policy receiving section 355, a file access request message processing section 356, a file access completion message processing section 357, and a file access destination determination section 358.

The computer policy table management section 351 is a module for managing the computer policy table 321, and it receives update information concerning policies and an accessibility states of respective computers 110 either from the computer policy receiving section 355 or the computer accessibility status confirmation section 354, and writes such information to the computer policy table 321 in the integrated management data storage 225 via the integrated management data storage controller control section 332 in the OS 213. Further, the computer policy table management section 351 receives a request to read information concerning policies and accessibility states of respective computer 110 from the file access destination determination section 358, reads such requested information from the computer policy table 321 in the integrated management data storage 225 via the integrated management data storage controller control section 332 in the OS 213, and sends such information to the file access destination determination section 358.

The file location table management section 352 is a module for managing the location of files to be accessed within the system, and it receives a completion notification of the writing or the deletion of files from the file access completion message processing section 357, and reflects the notification on the directory structure data 322 in the integrated management data storage 225 via the integrated management data storage controller control section 332 in the OS 213. Further, the file location table management section 352 receives an inquiry concerning the location of a certain file from the file access destination determination section 358, reads the file location information from the directory structure data 322 in the integrated management data storage 225 via the integrated management data storage controller control section 332 in the OS 213, and sends the information to the file access destination determination section 358.

The receiving/transmitting message classifying section 353 is a module for receiving messages from the computers 110 and classfying the messages, and it receives messages from computers 110 via the network controller control section 333 in the OS 213, and delivers the messages either to the computer policy receiving section 355, the file access request message processing section 356, or the file access completion message processing section 357. Further, the receiving/transmitting message classifying section 353 receives messages to be transmitted from the computer policy receiving section 355, or the file access request message processing section 356 to the computers 110, and transmits such messages to computers 110 via the network controller control section 333 in the OS 213. Furthermore, every time the receiving/transmitting message classifying section 353 receives any messages from the computer 110, it notifies the computer accessibility status confirmation section 354 of such reception of messages.

When the computer accessibility status confirmation section 354 is notified by the receiving/transmitting message classifying section 353 of the fact that the section 353 has received any message from the computers 110, it requests the computer policy table management section 351 to reflect the fact that the computers 110 are accessible on the computer policy table 321. Further, the computer accessiblity status confirmation section 354 which are periodically invoked by the timer control section 334 in the OS 213 deems that the computers 110 which have not been sending any messages since the scction 354 was invoked last time by the timer control section 334 are in a halt, and requests the computer policy table management section 351 to reflect such fact on the computer policy table 321. By the way, such computers 110 that are acceeible, but are not making any access to files will transmit a message (a keep alive message), which is used at a predetermined interval to notify the integrated server 100 of only the fact that the computers themselves are accessible. By taking such an arrangement, the present state of computers 110 can adequately be reflected on the computer policy table 321, thus enabling access to auxiliary storage according to the present state of the computers 110.

The computer policy receiving section 355 is a module for receiving computer policy information, and it receives policy registration messages originated by the computers 110 from the receiving/transmitting message classifying section 353, analyzes the messages and extracts policy information out of them, whereby it registers the messages to the computer policy table 321 by delivering them to the computer policy table management section 351. In addition, when a policy change that may come up with a moving or a deletion of files has been made, the computer policy receiving section 355 inquires the file access destination determination section 358 as to which files recorded in which computers 110 should be deleted, or in which computers 110 new files should be written. As a result of such an inquiry, if the file access destination determination section 358 has responded that the moving or the deletion should be done, the computer policy receiving section 355 builds up a message to notify the delete/write destination computers 110 thus answered back, and transmits the message to the policy registration source computer 110 via the receiving/transmitting message classifying section 353.

The file access request message processing section 356 is a module for processing messages for requesting file access, and it receives file access request messages (such as destination inquiries for writing, reading and deletion) that are originated by processing computers 110 from the receiving/transmitting message classifying section 353, analyzes the messages, and send a request for the determination of adequate access destination computers 110 to the file access determination section 358. Thereafter, the file access request message processing section 356 receives a list of access destination computers 110 that have been determined by the file access determination section 358, converts the list into a form of responding message to the inquiry source computer 110, and return the message back to the inquiry source computer 110 by delivering the message to the receiving/transmitting message classifying section 353.

The file access completion message processing section 357 is a module for processing a message telling that file accessing has been completed, and it receives a file access completion message (a completion notification of a writing or a deletion) originated by a message computer 110 from the receiving/transmitting message classifying section 353, and rewrites the directory structure data 322 by analyzing the message and delivering it to the file location table management section 352.

Upon receiving an inquiry for a file access destination from the computer policy receiving section 355 or the file access request message processing section 356, the file access destination determination section 358 reads policy information of respective computers from the computer policy table management section 351, and the present location of a file in question from the file location table management section 352, creates a list of optimum file access destination computers 110 based on such information, and returns the list back to the module of the inquiry source.

(III) Data Structure Used for Storage Management Integrated System

Next, referring to FIGS. 4 to 6, a data structure used for a storage management integrated system according to the present invention will now be described.

First, referring to FIG. 4, a computer policy table 321 will now be described.

FIG. 4 is a configuration diagram showing a form of a computer policy table 321.

The computer policy table 321 includes, as shown in FIG. 4, a computer ID 410, a computer IP address 420, policy information 430 of the computer, available space 440, and a computer's present accessibility state 450.

The computer ID 410 is an identifier for uniquely identifying respective computers 110 which are participating in an integrated system, and different computer IDs 410 will be assigned to respective computers 110 that is participating in the integrated system. The computer IP address 420 is an IP address that is used as a destination when an IP packet is being transmitted to a computer 110 which has the computer ID 410 in question. In the first embodiment, also for a case where one computer 110 has a plurality of IP addresses, or a case where an IP address of a computer 110 is dynamically distributed by using a DHCP (Dynamic Host Configuration Protocol), etc., an additional computer ID 410 is arranged independently from an IP address 420 in order to uniquely enable the identification of respective computers 110.

The policy information 430 of the computer is policy information concerning the use of auxiliary storage 120 which is provided by a computer 110 to an integrated system so that the computer 110 incorporating the computer ID 410 in question allows other access computers to use the auxiliary storage. The policy information 430 has an important meaning in the operation of the system, since the integrated server selects computers 110 which should be accessed according to the conditions described in the policy information 430.

The policy information 430 of the computer is used by a file access destination determination section 358 in order to determine adequate access destination computers 110. FIG. 4 illustrates only an example of the policy information, and various other items may be considered in accordance with other conditions.

As examples of items to be included in the policy information 430 illustrated in FIG. 4, a type 431 of the computer 110 in question, a total space 432, an available time zone 433, a priority of selection 434, etc. may be included.

The type 431 is an item for indicating types of the computer whether it is either equipment that is always connected to, mobile equipment that are frequently disconnected from a network, or a proxy access computer of a specified computer, etc. The total space 432 implies the space of a volume for the auxiliary storage that is offered to the integrated system by the computer 110 in question, more specifically the total space that can be shared. The available time zone 433 implies a time zone in which the computer is accessible, and no access will be executed from other computers 110 at any time beyond the time zone 433.

The priority of selection 434 is an index for designating to what degree of priority the computer 110 should be selected as the applicable computer for writing or reading files at the time when access are made from other computers.

The available space 440 is the space of a volume that is currently left unused out of the entire storage volume which is to be offered to the integrated system and is provided in the auxiliary storage 120 located in the concerned computer 110. A value of the available space 440 is subjected to a change when the writing or the deletion of a file is executed or when the policy information 430 is modified.

The computer's present accessibility state 450 is a value which indicates whether or not the computer 110 in question is currently accessible and participates in the integrated system. For computers 110 which have not transmitted any messages to the integrated server for a certain period of time due to reasons such as the stoppage of computers and the disconnection from a network, a value indicating "out of service" will be filled in the field of the accessibility state 450.

Next, referring to FIGS. 5 and 6, a data structure for the file management of a storage management integrated system of the present invention will now be described.

Figure 5:
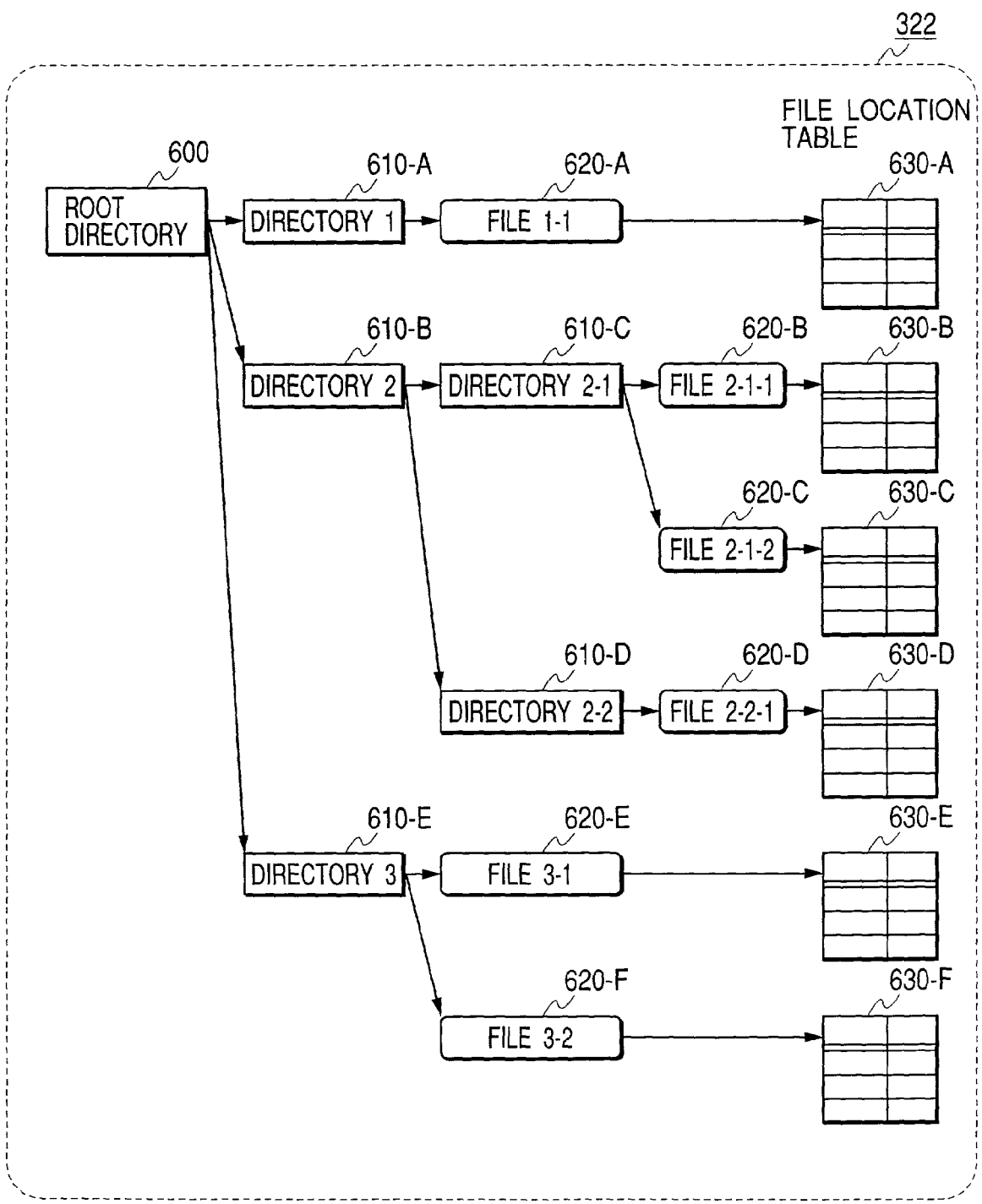
FIG. 5 is a configuration diagram showing a form of a directory structure data 322 used for file management according to the first embodiment of the present invention.

FIG. 5 is a structural diagram illustrating a form of a directory structure data 322 for the file management according to the first embodiment of the present invention.

FIG. 6 is a configuration diagram illustrating a form of a file location table 630.

The directory structure data 322 is configured, as shown in FIG. 5, in a tree structure, wherein a root directory 600 is defined to be a root, directories other than the root directory are intermediate nodes, and file information 620 are to be leaves. In the root directory 600, the directories 610 and the file information 620, their own directories or file properties (for example, a date of initial creation, a date of recent update, access rights, accessible user groups, etc.) are recorded. In the directories 610 and the file information 620, their own directories and names attached to files are also recorded. It should be noted, however, that the file information 620 does not involve contents (data entity) of files, and only points at the file location table 630. More specifically, all file information 620 is respectively coordinated to a file location table 630, and therefore, by using the table, it is possible to determine which computer 110 records the file contents.

The file location table 630 is a table that is used to manage the location of files within the system, and it contains a file storage destination computer ID 710 and a storage file property information 720.

The file storage destination computer ID 710 is a computer ID of a computer that retains contents of files that are coordinated to the file location table in question. In the storage file property information 720, such information, among the file property information in question, which is likely to differ by computers that are to be destinations of file contents. Various items could be available as examples of items to be included in the storage file property information 720, however, in the first embodiment, a file contents final update source computer ID 721, an update source time stamp 722 in the file contents final update source computer, a write completion receiving date 723 when the integrated server 100 in question finally received a file contents write completion notification, etc. are shown in FIG. 6 as an example.

Here, when the file location table 630 shown in FIG. 5 has a plurality of records for a file, it implies that the same file will be stored in respective auxiliary storage of a plurality of computers 110. Placing the same file in a plurality of computers 110 offers a significance to enhance the data security and an advantage that, at the time of reading files, files can be read out from a computer 110 whose reading speed is faster.

(IV) Operation of Storage Management Integrated System

Next, referring to FIGS. 7 to 9, operations of a storage management integrated system according to the first embodiment of the present invention will now be described.

(1) File Writing

First, referring to FIG. 7, operations of the system that are performed when a computer 110 writes files to auxiliary storage of other computers will now be described.

Figure 7:
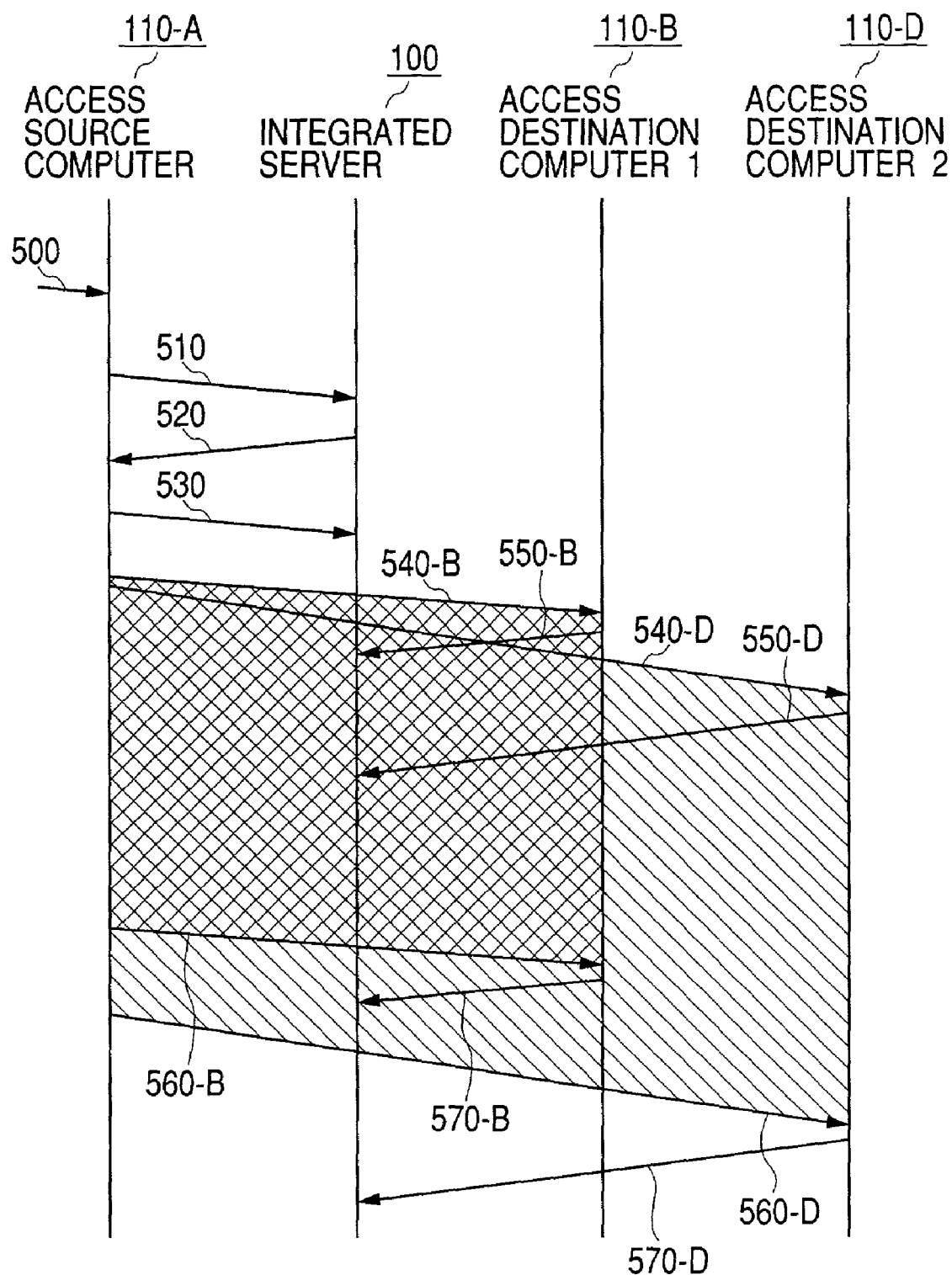
FIG. 7 is a sequence diagram showing system operations at the time when a computer 110 writes a file into auxiliary storage of other computers.

FIG. 7 is a sequence diagram showing the system operations that are performed when a computer 110 writes files to auxiliary storage of other computers.

FIG. 7 illustrates, in sequence, operations that are performed when a certain computer 110-A writes files, by using the integrated server 100, to auxiliary storage owned by a plurality of other computers 110-B and 110-D.

First, when a request for file writing to the integrated system occurs in an access source computer 110-A following operations of an operator of the computer (Sequence 500), the access source computer 110-A transmits, in order for acknowledging an adequate file write destination computer, a message inquiring for a write destination to the integrated server 100 (Sequence 510).

Upon receiving the message, the integrated server 100 creates a list of computers which are suitable for the write destination based on policy information, an accessibility state, etc. of respective computers that are registered with a computer policy table 321 in the integrated server, and data which indicate the location of files that is stored in a directory structure data 322, and sends the list back to the computer 110-A as a response message (Sequence 520).

The computer 110-A extracts only those computers that are judged by the computer itself to be adequate for the write destination out of computers on the list which the computer received from the integrated server 100, and transmits the list to the integrated server 100 as a write destination determination notification message (Sequence 530).

It should be noted, however, that the integrated server 100 which has received the determination notification message (Sequence 530), even if it has received an inquiry message for the writing or the deletion of the same file from other computers, reserves a response to the inquiry until the computer 110-A commences the file writing to all of the write destination computers, or a certain period of time has elapsed. This arrangement has been made because the data consistency may not be retained if a plurality of computers makes simultaneous writing to the same file located in an access destination computer.

Next, the computer 110-A which has transmitted the determination notification message (Sequence 530) initiates the file writing to all write destination computers selected (i.e., computers 110-B and 110-D in this case)(Sequence 540). Consequently, a file with the same contents will be written into each of the write destination computers.

When the writing has been initiated in Sequence 540, the write destination computers 110-B and 110-D transmit a write initiation notification message to the integrated server 100 (Sequence 550). Upon receiving the write initiation notification message from all of the write destination computers, the integrated server 100 resumes a response against the inquiry message for the writing or the deletion of the same file from computers other than the computer 110-A.

The computer 110-A concurrently writes the same file to both the computers 110-B and 110-D. Upon the completion of such writing (Sequence 560), the write destination computers 110-B and 110-D transmit a write completion notification message to the integrated server 100 (Sequence 570). The integrated server 100, every time it receives a write completion notification message, reflects the fact that the file is available in the write destination computer on a directory structure data 322 located within the integrated server 100.

(2) File Reading

Next, referring to FIG. 8, operations of the system that are performed when a computer 110 reads files from auxiliary storage of other computers will now be described.

Figure 8:
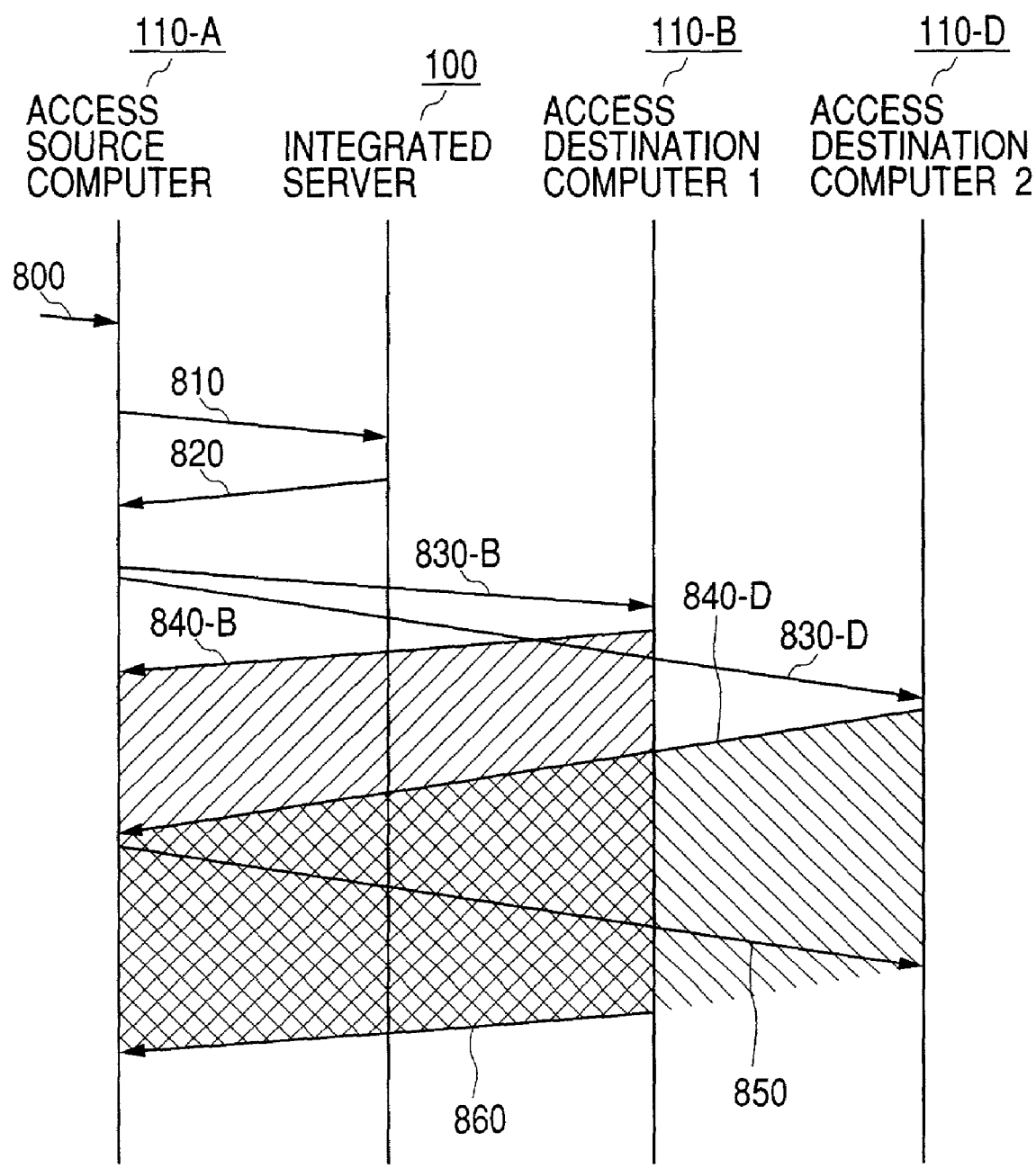
FIG. 8 is a sequence diagram showing system operations at the time when a computer 110 reads a file from auxiliary storage of other computers.

FIG. 8 is a sequence diagram showing the system operations that are performed when the computer 110 reads files from auxiliary storage of other computers.

In FIG. 8, operations that are performed when a certain computer 110-A reads files, by utilizing the integrated server 100, from auxiliary storage owned by a plurality of other computers 110-B and 110-D are described in sequence.

First, when a request for file reading from the integrated system occurs in an access source computer 110-A following operations of an operator of the computer (Sequence 800), the access source computer 110-A transmits, in order for acknowledging an adequate file read source computer, a read source inquiry message to the integrated server 100 (Sequence 810). Upon receiving the message, the integrated server 100 creates a list of computers which are suitable for the read source based on policy information, an accessibility state, etc. of respective computers that are registered with a computer policy table 321 in the integrated server, and data which indicate the location of files that is stored in a directory structure data 322, and sends the list back to the computer 110-A as a response message (Sequence 820). Here, it should be noted that the integrated server 100 need not list all computers in which files to be read out are available. More specifically, the integrated server 100 may only create a list of most adequate computers based on the policy information currently available.

The computer 110-A extracts only those computers that are judged by the computer itself to be adequate for the read source out of computers on the list which the computer received from the integrated server 100, and transmits a read file request to all of those computers (i.e., computers 110-B and 110-D in this case) (Sequence 830).

Upon receiving the read file request, the access destination (read source) computers 110-B and 110-D send properties of the file to the access source computer 110-A, and then initiates the transmission of file contents (Sequence 840). Upon receiving the file properties from the access destination computers 110-B and 110-D, the computer 110-A selects the most adequate access destination computer among those computers, based on the time until the file properties are received or on the contents of the properties, instructs only the selected computer to continuously send the file contents, and sends a file transmission interruption request message to other computers (Sequence 850).

More specifically, it will be so arranged that access is made only to a computer which offer best response and high-speed processing since data contents they have are similar.

The access destination computer 110-D which has received the file transmission interruption request message interrupts the transmission of file, but the access destination computer 110-B which has not received the message transmits the entire file contents to the access source computer 110-A (Sequence 860).

(3) File Deleting

Next, referring to FIG. 9, operations of the system that are performed when a computer 110 deletes files stored in auxiliary storage of other computers will now be described.

Figure 9:
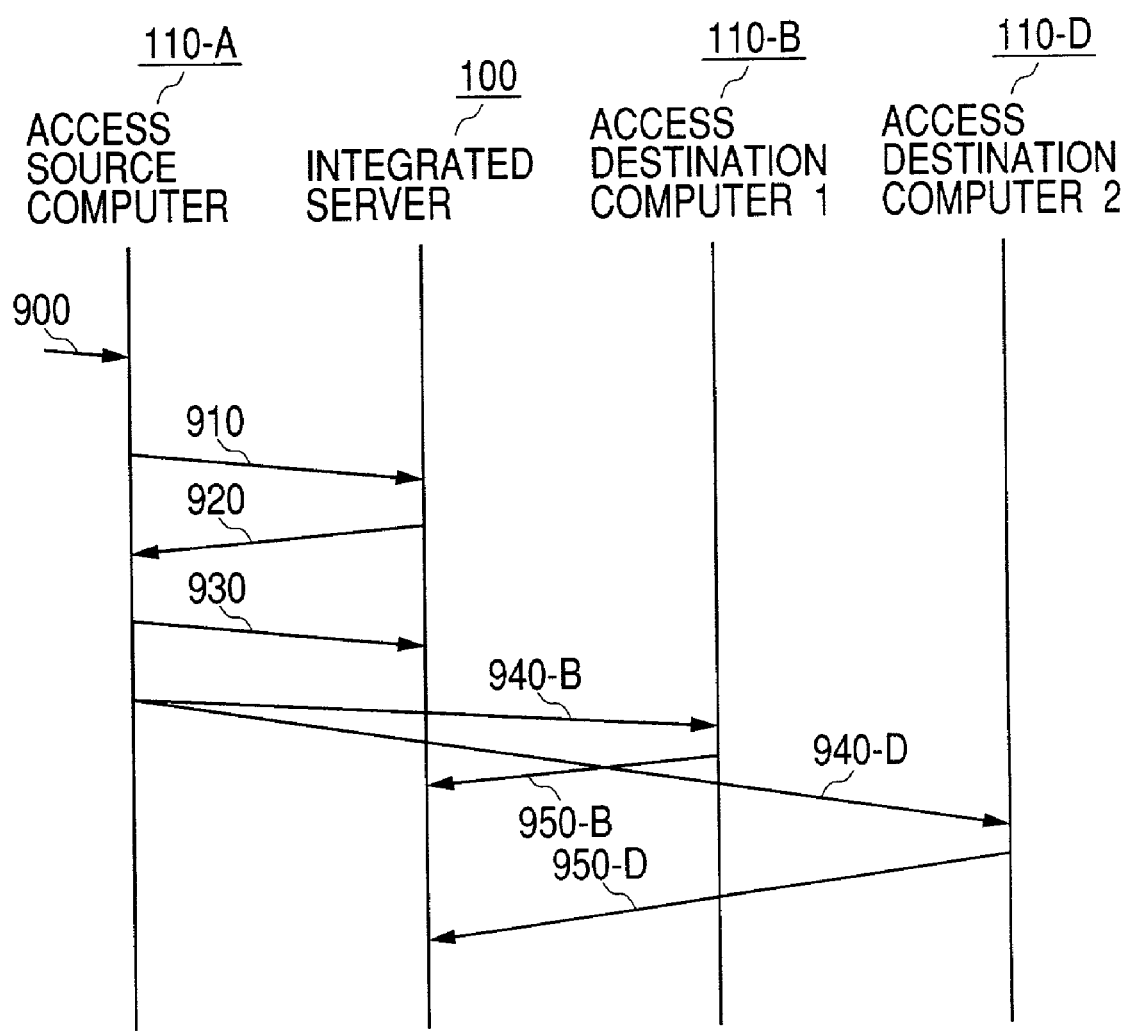
FIG. 9 is a sequence diagram showing system operations at the time when a computer 110 delete files that are stored in auxiliary storage of other computers.

FIG. 9 is a sequence diagram showing the system operations that are performed when the computer 110 deletes files stored in auxiliary storage of other computers.

In FIG. 9, operations that are performed when a certain computer 110-A deletes files, by utilizing the integrated server 100, from auxiliary storage owned by a plurality of other computers 110-B and 110-D are described in sequence.

First, when a request for file deletion to the integrated system occurs in an access source computer 110-A following operations of an operator of the computer (Sequence 900), the access source computer 110-A transmits, in order for acknowledging an adequate file delete destination computer, a message inquiring for a delete destination to the integrated server 100 (Sequence 910).

Upon receiving the message, the integrated server 100 creates a list of computers which are suitable for the delete destination based on policy information, an accessibility state, etc. of respective computers that are registered with a computer policy table 321 in the integrated server, and data which indicate the location of files that are stored in a directory structure data 322, and sends the list back to the computer 110-A as a response message (Sequence 920).

For the processing of files, it is desirable that all files in computers that can be deleted should be deleted in order to keep the consistency of data. However, for example, files stored in auxiliary storage of computers 110 which are not accessible cannot be deleted. This is the reason why the integrated server 100 creates, on the basis of the policy information of computers, a list of computers that can be deleted. In addition, if some files could not be deleted according to the first delete request, it is desirable to arrange that another delete request should be issued again after a certain period of time.

The computer 110-A extracts only those computers, which judge them to be able to delete by themselves, out of computers on the list that the computer received from the integrated server 100, and transmits the list to the integrated server 100 as a delete destination determination notification message (Sequence 930).

It should be noted, however, that, the integrated server 100 which has received the determination notification message (Sequence 930), even if it has received an inquiry message for the writing or the deletion of the same file from other computers, reserves a response to the inquiry until the computer 110-A sends a delete request to all of the delete destination computers, or a certain period of time has elapsed. This arrangement has been made to prevent a situation, wherein, if a computer which requests the writing of the same file and a computer which requests the deletion of the file simultaneously issued such requests to a plurality of computers, a computer to which a new file is written and a computer from which a file has been deleted exist concurrently.

The computer 110-A which has transmitted the determination notification message (Sequence 930) transmits a delete request of file to all deletion destination computers (i.e., computers 110-B and 110-D in this case) (Sequence 940). Upon receiving the delete request in the Sequence 940, the deletion destination computers 110-B and 110-D delete the files in question that are recorded in auxiliary storage, and transmit a delete completion notification message to the integrated server 100 (Sequence 950). Upon receiving the delete completion notification message, the integrated server 100 reflects the fact that the file no longer exists in the delete destination computers on the directory structure data 322 located in the integrated server 100. Upon receiving the delete completion notification message from all delete destination computers, the integrated server 100 resumes a response against the inquiry message for the writing or the deletion of the same file from computers other than the computer 110-A. At this time, in the case of making a deletion against a file, since the file concerned has already been deleted, those requests shall be judged to be errors. While, in the case of making a write against a file, the requests may be judged to be errors, or, after creating a new file, a writing process may be applied to the new file.

[Second Embodiment]

A second embodiment of the present invention will now be described in detail with reference to FIGS. 10 and 11.

The basic idea of the second embodiment is the same as that of the first embodiment in terms of the storage management of a system, except for a point wherein the second embodiment has a proxy access computer which acts as an intermediary between an access destination computer and an access source computer.

(I) Configuration of Storage Management Integrated System

Figure 10:
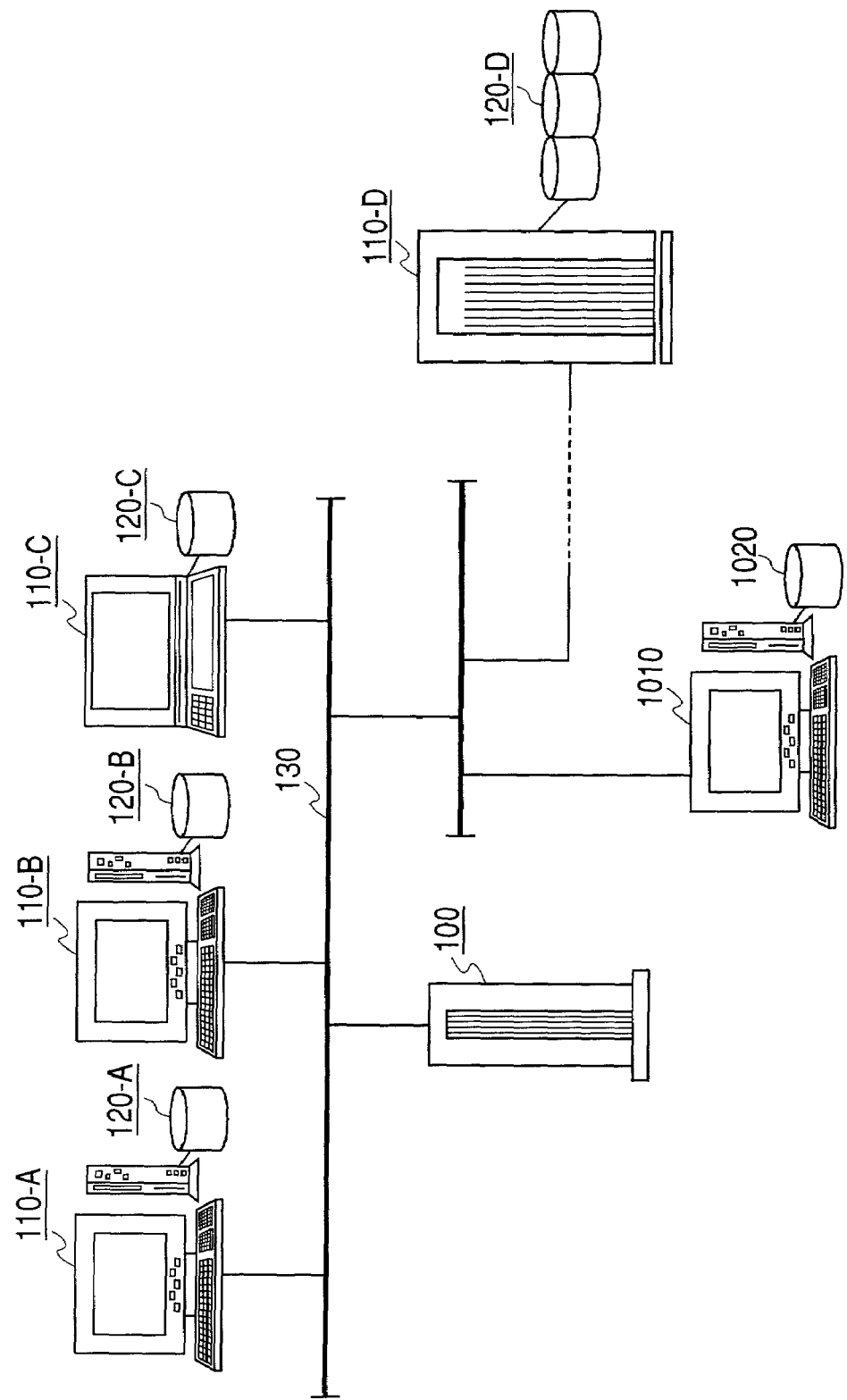
FIG. 10 is a system configuration diagram of a storage management integrated system according to a second embodiment of the present invention.

Referring to FIG. 10, a configuration of a storage management integrated system according to the second embodiment of the present invention will now be described.

FIG. 10 is a system configuration diagram of a storage management integrated system according to the second embodiment of the present invention.

The storage management integrated system according to the second embodiment of the present invention comprises a storage management integrated server 100, a plurality of computers 110 each of which has an auxiliary storage 120 and a proxy access computer 1010, which are connected to each other via a network 130.

More specifically, with the second embodiment, a proxy access computer 1010 is provided within an integrated system, and it is also arranged that, when files are written to a computer 110-D from other computers 110-A, 110-B and 110-C, the writing should be executed through the proxy access computer 1010. By taking such arrangement, even in the case where the communication speed is slow between the computer 110-D and a network 130 in which other computers 110-A, 110-B and 110-C, the integrated server 100 and the proxy access computer 1010 exist, the computers 110-A, 110-B and 110-C can be released earlier from a file writing process, thus enabling an improvement in throughput. However, it is not mandatory, whenever files are written to the computer 110-D from the computers 110-A, 110-B and 110-C, to execute the file writing through the proxy access computer 1010, but the file writing may be directly made to the computer 110-D. In addition, regarding the reading and the deleting of files, the proxy access computer 1010 is equivalently treated as other computers 110. For example, when the computer 110-A is reading a certain file, it is not necessary to discriminate between a file that is located in the computer 110-D and a file that is in the proxy access computer 1010. However, it should be possible that the integrated server 100 may be considered to be a proxy access computer 1010 when an adequate access destination computer is to be selected on a basis of a policy.

In an auxiliary storage 1020 which is owned by the proxy access computer 1010, the contents of files that have been written to other computers 110 via the proxy access computer 1010 in question are recorded. However, it is not always necessary that all files written via the proxy access computer 1010 in question should be recorded. If a procedure equivalent to that for the deleting of files written to normal computers 110 is taken, the files recorded in the proxy access computer 1010 in question may be deleted while keeping the files in question undeleted in the computers 110 which are the final write destinations. More specifically, files recorded in the proxy access computer 1010 may be deleted after having written the files to other computers 110.

(II) Operation of Storage Management Integrated System

Next, referring to FIG. 11, operations of a storage management integrated system according to the second embodiment of the present invention will now be described.

Figure 11:
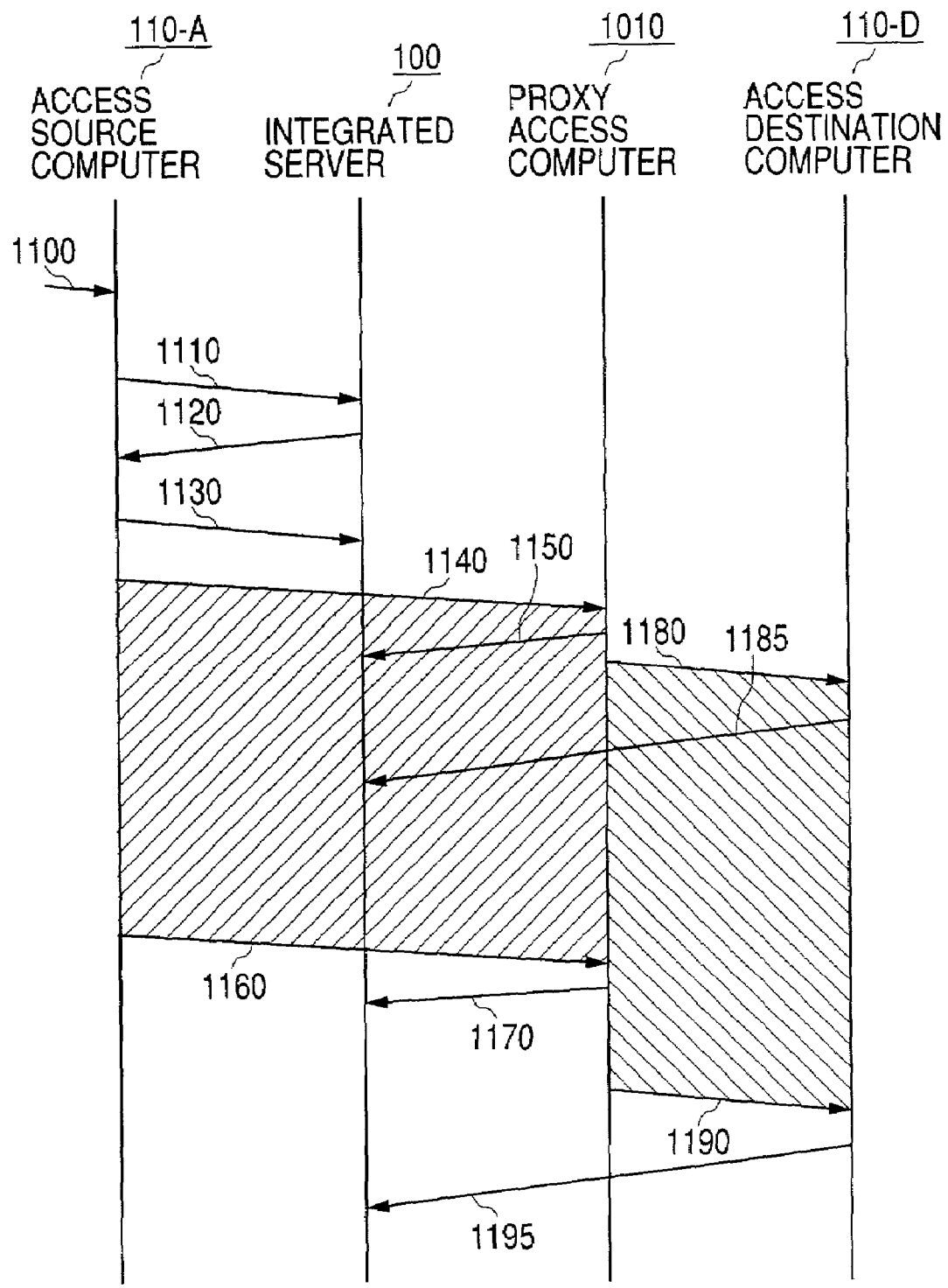
FIG. 11 is a sequence diagram showing system operations at the time when a computer 110 writes files to auxiliary storage of other computers via a proxy access computer 1010.

FIG. 11 is a sequence diagram showing system operations that are performed when a computer 110 writes files to auxiliary storage of other computers via a proxy access computer 1010.

In FIG. 11, operations that are performed when a certain computer 110-A writes files, by utilizing an integrated server 100, to auxiliary storage owned by another computer 110-D via a proxy access computer 1010 are described in sequence.

First, when a request for file writing to an integrated system occurs in an access source computer 110-A following operations of an operator of the computer (Sequence 1100), the access source computer 110-A transmits, in order for acknowledging an adequate file write destination computer, a message inquiring for a write destination to the integrated server 100 (Sequence 1110).

Upon receiving the message, the integrated server 100 creates a list of computers which are adequate for the write destination on the basis of policy information, an accessibility state, etc. of respective computers that are registered with a computer policy table 321 in the integrated server shown in FIG. 4, and data which indicate the location of files that are stored in a directory structure data 322, and sends the list back to the computer 110-A as a response message (Sequence 1120).

The computer 110-A extracts only those computers that are judged by the computer itself to be adequate for the write destination out of computers on the list which the computer received from the integrated server 100, and transmits the list to the integrated server 100 as a write destination determination notification message (Sequence 1130).

It should be noted, however, that the integrated server 100 which has received the determination notification message (Sequence 1130), even if it has received an inquiry message for the writing or the deletion of the same file from other computers, reserves a response to the inquiry until the computer 110-A commences writing to all of the write destination computers, or a certain period of time has elapsed. This arrangement has been made according to the similar purpose as described for the first embodiment.

The procedures described hereto are precisely the same as the write sequences from 500 to 530 described in the first embodiment in which the writing is executed without going through the proxy access computer 1010, except that the proxy access computer 1010 is not included in the computer list to be exchanged between the computer 110-A and the integrated server 100.

With the second embodiment, it shall be understood that the computer list to be transmitted to the computer 110-A from the integrated server 100 in Sequence 1120 shall have a statement that, when a file is written to the proxy access computer 1010, the file should be finally written to the computer 110-D.

The computer 110-A which has transmitted the determination notification message (Sequence 1130) commences file writing to all write destination computers that are selected out of the write destination computers. However, in the case where it is arranged that the writing to the computer 110-D is to be executed via the proxy access computer 1010, the computer 110-A commences the file writing to the proxy access computer 1010 (Sequence 1140).

When the writing has been initiated in Sequence 1140, the proxy access computer 1010 transmits a write initiation notification message to the integrated server 100 (Sequence 1150), and also initiates the relaying of file writing to the computer 110-D which is the final write destination (Sequence 1180). When the file writing has been initiated in Sequence 1180, the final write destination computer 110-D transmits a write initiation notification message to the integrated server 100 (Sequence 1185). Upon receiving the write initiation notification message from all write destination computers including both the proxy access computer 1010 and the final write destination computer 110-D, the integrated server 100 resumes a response against the inquiry message for the writing or the deletion of the same file from computers other than the computer 110-A.

The computer 110-A continuously executes the file writing to the proxy access computer 1010, and upon completing the writing (Sequence 1160), the proxy access computer 1010 transmits a write completion notification message to the integrated server 100 (Sequence 1170). In parallel with such operations, the proxy access computer 1010 continuously executes the file writing to the computer 110-D, and upon completing the writing (Sequence 1190), the computer 110-D transmits a write completion notification message to the integrated server 100 (Sequence 1195). The integrated server 100, every time it receives the write completion notification message (Sequences 1170 and 1195), reflects the fact that the file actually exists in the write destination computer (including the proxy access computer) on the directory structure data 322 located in the integrated server 100.

[Third Embodiment]

A third embodiment according to the present invention will now be described in detail with reference to FIGS. 12 to 17.

With the first embodiment, only one integrated server is arranged in a network. On the other hand, in the third embodiment, a plurality of integrated servers is arranged to perform the storage management of computers on a larger-scale and wider-range network by utilizing a coordinating function among integrated servers.

(I) Configuration of Storage Management Integrated System

First, referring to FIG. 12, a configuration of a storage management integrated system according to the third embodiment of the present invention will now be described.

Figure 12:
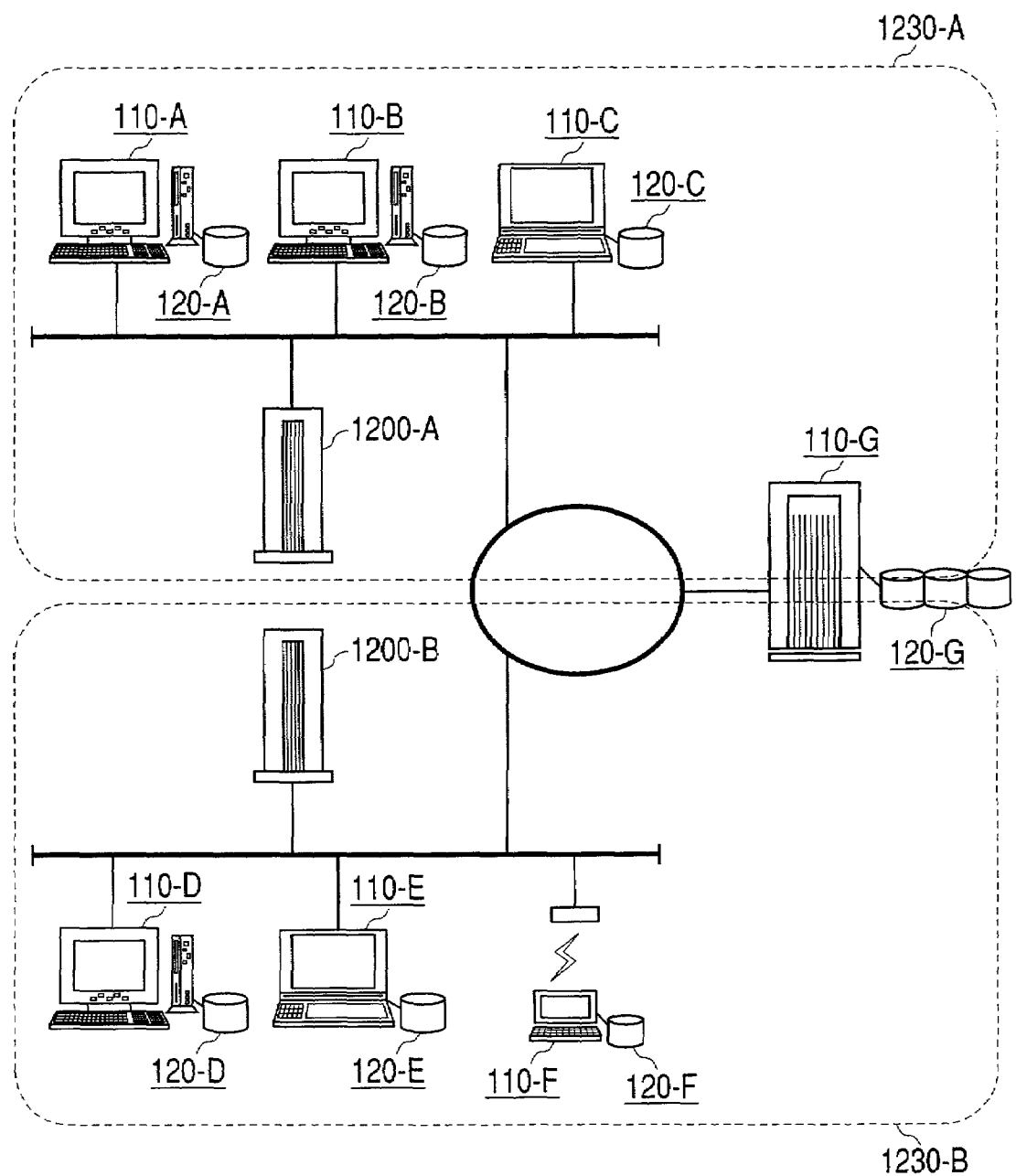
FIG. 12 is a system configuration diagram of a storage management integrated system according to a third embodiment of the present invention.

FIG. 12 is a system configuration diagram of a storage management integrated system according to the third embodiment of the present invention.

The storage management integrated system according to the third embodiment of the present invention employs a configuration, wherein a first network 1230-A and a second network 1230-B are provided, and further, both of the networks are independently interconnected to another network.

Further, the first network 1230-A incorporates a computer 110-A, a computer 110-B, a computer 110-C and an integrated server 1200-A, and the second network 1230-B incorporates a computer 110-D, a computer 110-E, a computer 110-F and an integrated server 1200-B. In addition, another network incorporates a computer 110-G.

Furthermore, by using the networks, it is possible that the integrated servers 1200 may work together and communicate with each other for the joint storage management, or computers 110 may communicate with each other for accessing files.

With the system configuration of the third embodiment, a plurality of integrated servers 1200 each having an interacting coordinating function are arranged within the storage management integrated system, and respective integrated servers 1200 independently manage the tree structure and file location information of specified sub-trees of the directory structure. Further, the entire integrated system forms one directory tree structure, and the entire system may refer to one directory tree structure, by exchanging information, such as which integrated server 1200 manages which sub-tree, between the integrated servers 1200.

Further, respective integrated servers 1200 have designated computers the servers should manage. In FIG. 12, it shall be understood that the integrated server 1200-A manages the computer 110-A, the computer 110-B and the computer 110-C in the network 1230-A, while the integrated server 1200-B manages the computer 110-D, the computer 110-E and the computer 110-F in the network 1230-B. With the third embodiment, even though the description is made assuming that the domain to be managed by each integrated server coincides with the topology of the network concerned, the present invention is not limited to this specific arrangement. It may be possible to arbitrarily assign the domain to be managed by each integrated server as one set of computers. For example, it may be arranged that the computer 110-G which is located in an external network, or mobile computers which execute remote access should be managed by the integrated server 1200-A. Furthermore, it may be arranged that different volumes of the computer 110-G should be assigned to respective different integrated servers 1200-A and 1200-B.

Further, concerning policy information, respective integrated servers 1200 are arranged only to manage policy information of computers 110 which are under their own management.

In addition, respective integrated servers 1200 keep track of locations of files which are owned by computers 110 that are under their own management. The locations of those files are definitely included in directory sub-trees which are under management of the integrated servers 1200 in question, and thus enabling access to files by referring to those locations.

(II) Configuration of Integrated Server

Next, referring to FIG. 13, a configuration of an integrated server 1200 according to the third embodiment of the present invention will now be described.

Figure 13:
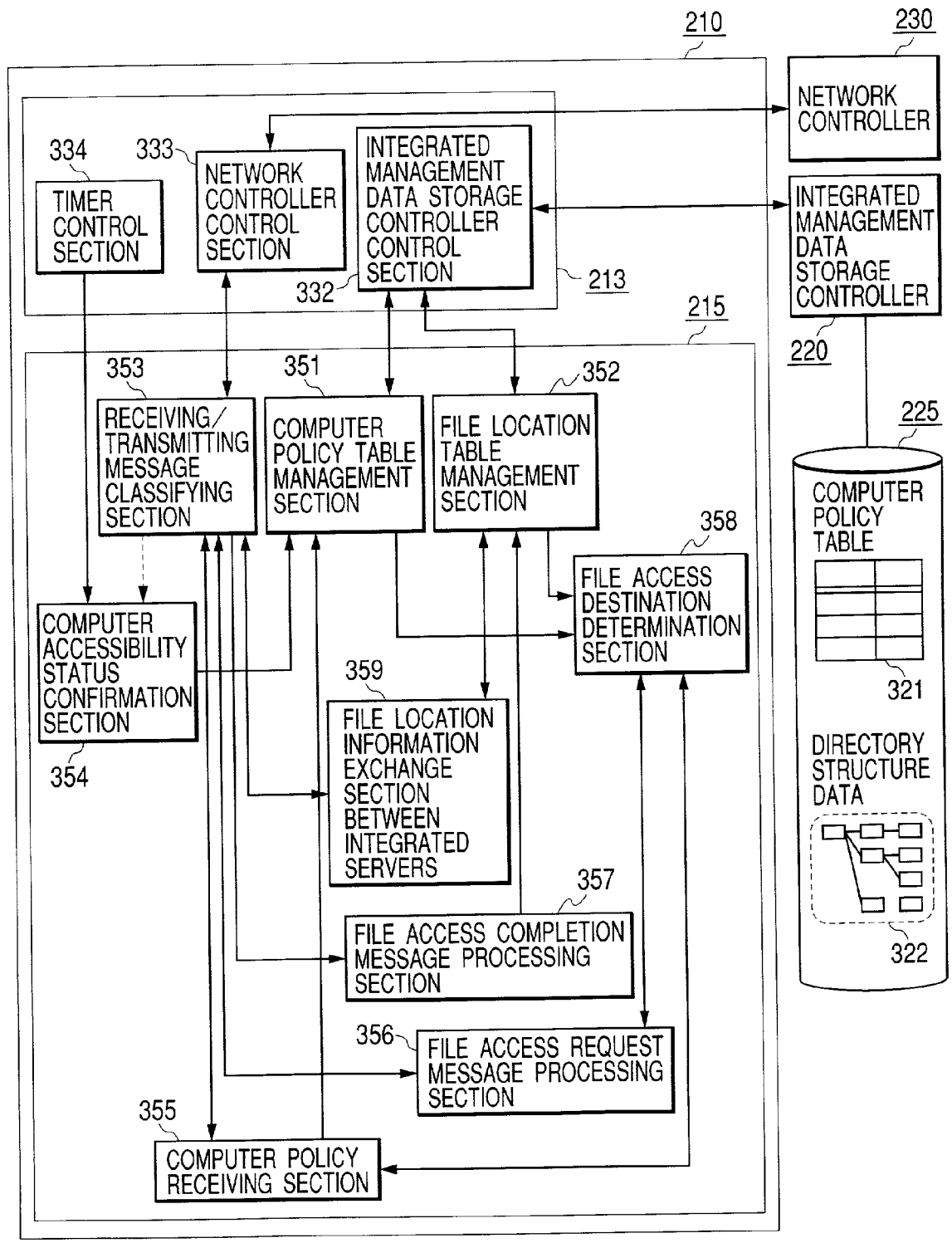
FIG. 13 is a configuration diagram illustrating programs for respective functions to be arranged in a memory 210 and data to be stored in an integrated management data storage 225 according to a third embodiment of the present invention.

FIG. 13 is a configuration diagram of programs according to functions to be arranged in a memory 210, and data to be stored in integrated management data storage 225 according to the third embodiment of the present invention.

The integrated server according to the third embodiment has a hardware configuration equivalent to that of the first embodiment, and therefore, a description will be made only to a differing point from the first embodiment, that is, programs according to functions to be installed in the memory 210.

The configuration of programs according to functions of the third embodiment is almost equivalent to that of the first embodiment, except for a point that a file location information exchange section between integrated servers 359 is provided.

Furthermore, another difference lies in a point where functions have been expanded so that the sections relating to communication such as a network controller 230, a network controller control section 333 and a receiving/transmitting message classifying section 353 may communicate with another integrated server 1200 in addition to access computers.

The file location information exchange section between integrated servers 359 is a module to enable a global storage management as a system by exchanging information on file locations between the integrated servers.

With the third embodiment, for the purpose of utilizing the coordinating function between the integrated servers, it is necessary that a directory path whose file location information are owned by a present integrated server 1200 should be registered, in advance, with a directory structure data 322 via a file location table control section 352.

In addition, regarding a directory path whose file location information are owned by other integrated servers 1200, a message to notify the directory path is received from other integrated servers 1200 via the receiving/transmitting message classifying section 353, and the directory path is registered with the directory structure data 322 via the file location table control section 352.

The file location information exchange section between integrated servers 359 reads the coordination of the directory path thus registered in the above-stated procedures with the present and other integrated servers 1200 from the directory structure data 322 via the file location table control section 352, composes a message to notify the coordination, and transmits the message to other integrated servers 1200 via the receiving/transmitting message classifying section 353.

Next, a description will now be made referring to the file location table control section 352. Where a coordination is being performed with other integrated servers 1200, the file location table control section 352 further receives information regarding the directory path whose file location information are owned by the present and other integrated servers 1200 from the file location information exchange section between integrated servers 359, and reflects the information on the directory structure data 322 in the integrated management data storage 225, via the integrated management data storage controller control section 332 in the OS 213. In addition, the file location table control section 352 determines which integrated server 1200 has which file location information under a directory path, by reading directory structure data 322 in the integrated management data storage 225, via the integrated management data storage controller control section 332 in the OS 213, and delivers the information to the file location information exchange section between integrated servers 359.

(III) Data Structure Used for Storage Management Integrated System

Next, referring to FIG. 14, a data structure used for a storage management integrated system according to the present invention will now be described.

Figure 14:
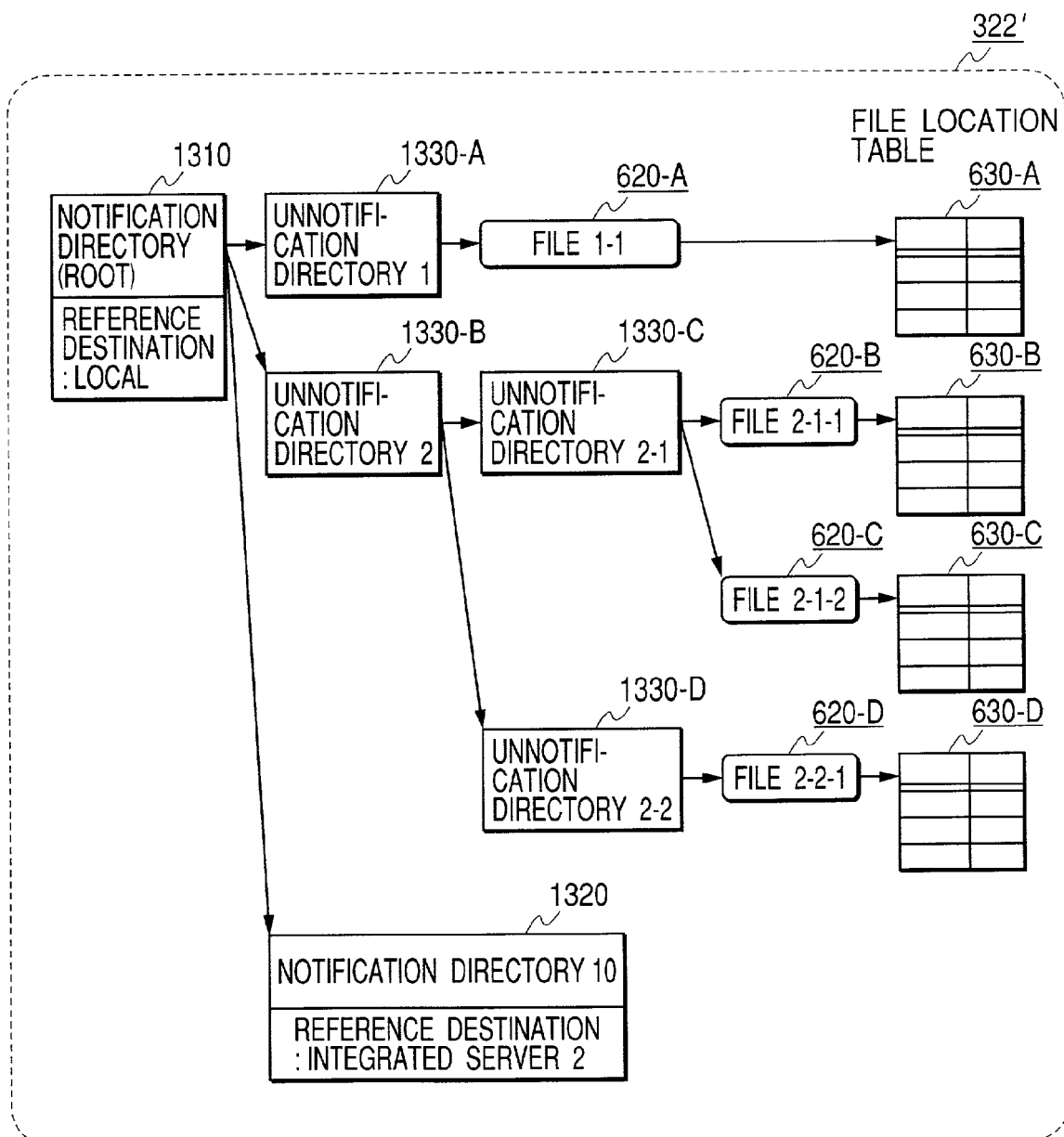
FIG. 14 is a configuration diagram showing a form of a directory structure data 322' used for the file management according to the third embodiment of the present invention.

FIG. 14 is a configuration diagram showing a form of a directory structure data 322' used for the file management according to the third embodiment of the present invention.

Now, a description will now be made on the third embodiment, by focusing on the form of the directory structure data 322' used for the file management to realize an interacting coordinating function.

Unlike a directory used by a first integrated server 110 that does not use an interacting coordinating function, there exist two types of directories, that is, a notification directory 1320 and a unnotification directory 1330 in a directory of directory structure data of an integrated server 1200 which has an interacting coordinating function.

The notification directory 1320 is a directory that has reference destination information in order to realize the interacting coordinating function, and when a directory or a file located under the notification directory is being referred to, access will be made to an integrated server 1200 that is designated to be a reference destination.

The unnotification directory 1330 is a directory which is used locally in a certain integrated server and is not disclosed to other integrated servers.

Here, it should be noted that a root directory 1310 must definitely be a notification directory. Further, a rule shall be established, wherein a parent node of the unnotification directory 1330 or file information 620 may either be the notification directory 1320 or the unnotification directory 133; however, a parent node of the notification directory 1320 should surely be the notification directory 1320.

In addition, it is arranged that all the integrated servers 1200 should share a notification directory 1320 and a root directory 1310, while the unnotification directory 1330 and file information 62 should be owned only by a specified integrated server 1200 which is managed by sub-trees that incorporates such information.

The notification directory 1320 incorporates reference destination integrated server information (such as IDs and IP addresses that are assigned to integrated servers) which indicates an integrated server that is managed by sub-trees whose root directory is the notification directory 1320.

In the directory example shown in FIG. 14, the reference destination of a root notification directory 1310 is "local", and a unnotification directory 1: 1330-A, a unnotification directory 2: 1330-B, and a notification directory 10: 1320 exist under the root notification directory 1310. When access is being made to a file owned by a computer 110 under the management of the integrated server 1200, searching will be made to two unnotification directories, while in a case where access is being made to a file owned by a computer 110 under the management of an "integrated server 2", the "integrated server 2" which incorporates a notification directory 10 will be accessed.

All contents of the notification directory 1320 are notified, every time the information thereof are added, deleted or modified, to all other integrated servers 1200, being originated from the integrated server 1200 which is defined to be the reference destination. Respective integrated servers 1200 reflect the notification directory 1320 thus notified on their own respective directory structure data 322. On the other hand, regarding the unnotification directory 1320 or the file information 620, even if the information have been added, deleted or modified, the reflection may simply be made by only the integrated server which is managed by the node on its own directory structure data 322.

(IV) Operation of Storage Management Integrated System

Next, referring to FIGS. 15 to 17, operations of a storage management integrated system according to the third embodiment of the present invention will now be described.

(1) File Writing

First, referring to FIG. 15, operations of the system that are performed when a computer 110 writes files, by utilizing an integrated server which has an interacting coordinating function, to auxiliary storage of other computers will now be described.

Figure 15:
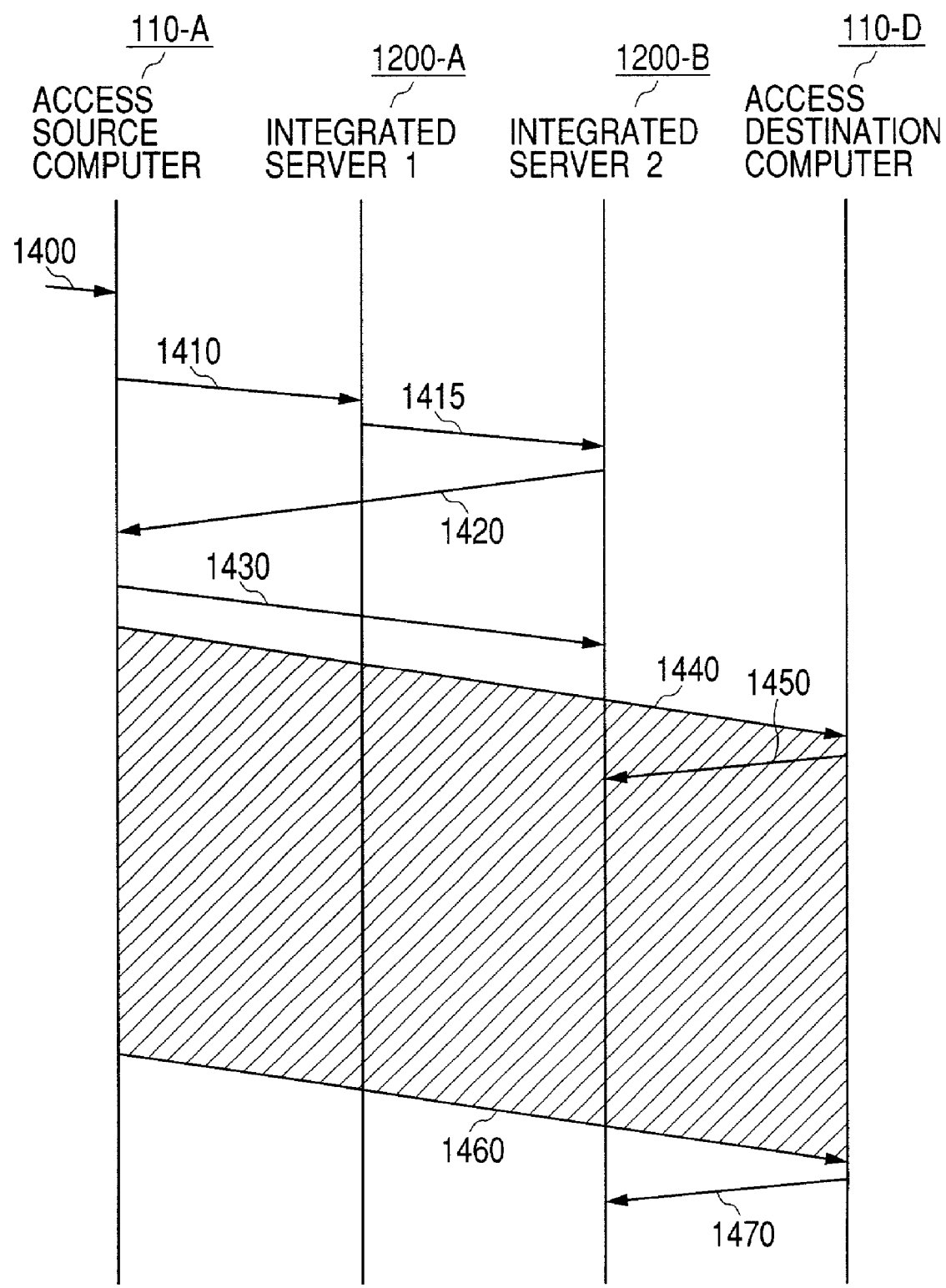
FIG. 15 is a sequence diagram showing system operations at the time when a computer 110 writes a file to auxiliary storage of other computers by utilizing an integrated server that has a mutual coordinating function.

FIG. 15 is a sequence diagram showing system operations that are performed at the time when a computer 110 writes files to auxiliary storage of other computers by utilizing an integrated server which has an interacting coordinating function.

In FIG. 15, operations that are performed when a certain computer 110-A writes files, by utilizing integrated servers 1200-A and 1200-B which have an interacting coordinating function, to auxiliary storage owned by other computers 110-D are described in sequence.

Initially, when a request for file writing to an integrated system occurs in an access source computer 110-A following operations of an operator of the computer (Sequence 1400), the access source computer 110-A transmits, in order for acknowledging an adequate file write destination computer, a message inquiring for a write destination to the integrated server 1200-A which is managed by a computer set 1230 including the access source computer 110-A (Sequence 1410).

Upon receiving the message, the integrated server 1200-A first determines which integrated server includes the file on the directory structure, and then, which sub-tree that is managed by the integrated server associated with the file includes the file. If the file is included in a sub-tree that is managed by the integrated server 1200-B other than the integrated server 1200-A, the integrated server 1200-A transmits an inquire message to the integrated server 1200-B (Sequence 1415).

The integrated server 1200-B which has received the message creates a list of computers which are adequate for the write destination on the basis of policy information, an accessibility state, etc. of respective computers that are registered with a computer policy table 321 in the integrated server, as well as data which indicate the location of files that are stored in a directory structure data 322, and sends the list back to the computer 110-A as a response message (Sequence 1420).

The computer 110-A extracts only those computers that are judged by the computer itself to be adequate for the write destination out of computers on the list which the computer received from the integrated server 1200-B, and transmits the list to the integrated server 1200-B as a write destination determination notification message (Sequence 1430).

The subsequent procedures may be described in the same way as those for the first embodiment, just by substituting the integrated server 100 referred to in the first embodiment with the integrated server 1200-B, and likewise, the sequences 540 to 570 in FIG. 7 with the sequences 1440 to 1470.

(2) File Reading

Next, referring to FIG. 16, operations of the system that are performed when a computer 110 reads files, by utilizing an integrated server which has an interacting coordinating function, from auxiliary storage of other computers will now be described.

FIG. 16 is a sequence diagram showing the system operations that are performed when the computer 110 reads, by utilizing an integrated server which has an interacting coordinating function, files from auxiliary storage of other computers.

In FIG. 16, operations that are performed when a certain computer 110-A reads files, by utilizing integrated servers 1200-A and 1200-B, from auxiliary storage owned by another computer 110-D are described in sequence.

First, when a request for file reading from an integrated system occurs in an access source computer 110-A following operations of an operator of the computer (Sequence 1500), the access source computer 110-A transmits, in order for acknowledging an adequate file read source computer, a read source inquiry message to the integrated server 1200-A which is managed by a computer set 1230 including the access source computer 110-A (Sequence 1510).

Upon receiving the message, the integrated server 1200-A first determines which integrated server includes the file on the directory structure, and then, which sub-tree that is managed by the integrated server associated with the file includes the file. If the file is included in a sub-tree that is managed by the integrated server 1200-B other than the integrated server 1200-A, the integrated server 1200-A transmits an inquire message to the integrated server 1200-B (Sequence 1515).

The integrated server 1200-B which has received the message creates a list of computers which are adequate for the read source on the basis of policy information, an accessibility state, etc. of respective computers that are registered with a computer policy table 321 in the integrated server, as well as data which indicate the location of files that are stored in a directory structure data 322, and sends the list back to the computer 110-A as a response message (Sequence 1520).

The computer 110-A extracts only those computers that are judged by the computer itself to be adequate for the read source out of computers on the list which the computer received from the integrated server 1200-B, and transmits the list to the integrated server 1200-B as a read source determination notification message (Sequence 1530).

The subsequent procedures may be described in the same way as those for the first embodiment, just by substituting the integrated server 100 referred to in the first embodiment with the integrated server 1200-B, and likewise, the sequences 840 to 860 in FIG. 8 with the sequences 1540 to 1560.

(3) File Deleting

Next, referring to FIG. 17, operations of the system that are performed when a computer 110 deletes, by utilizing an integrated server which has an interacting coordinating function, files stored in auxiliary storage of other computers will now be described.

FIG. 17 is a sequence diagram showing the system operations that are performed when the computer 110 deletes, by utilizing an integrated server which has an interacting coordinating function, files stored in auxiliary storage of other computers.

In FIG. 17, operations that are performed when a certain computer 110-A deletes files, by utilizing integrated servers 1200-A and 1200-B, from auxiliary storage owned by another computer 110-D are described in sequence.

First, when a request for file deleting from an integrated system occurs in an access source computer 110-A following operations of an operator of the computer (Sequence 1600), the access source computer 110-A transmits, in order for acknowledging an adequate file delete destination computer, a delete destination inquiry message to the integrated server 1200-A which is managed by a computer set 1230 including the access source computer 110-A (Sequence 1610).

Upon receiving the message, the integrated server 1200-A first determines which integrated server includes the file on the directory structure, and then, which sub-tree that is managed by the integrated server associated with the file includes the file. If the file is included in a sub-tree that is managed by the integrated server 1200-B other than the integrated server 1200-A, the integrated server 1200-A transmits an inquire message to the integrated server 1200-B (Sequence 1615).

The integrated server 1200-B which has received the message creates a list of computers which are adequate for the delete destination on the basis of policy information, an accessibility state, etc. of respective computers that are registered with a computer policy table 321 in the integrated server, as well as data which indicate the location of files that are stored in a directory structure data 322, and sends the list back to the computer 110-A as a response message (Sequence 1620).

The computer 110-A extracts only those computers that are judged by the computer itself to be adequate for the delete destination out of computers on the list which the computer received from the integrated server 1200-B, and transmits the list to the integrated server 1200-B as a delete destination determination notification message (Sequence 1630).

The subsequent procedures may be described in the same way as those for the first embodiment, just by substituting the integrated server 100 referred to in the first embodiment with the integrated server 1200-B, and likewise, the sequences 940 to 950 in FIG. 9 with the sequences 1640 to 1650.

As understood from the description for preferred embodiments, according to the present invention, a storage management integrated system and a storage control method for the storage management integrated system can be provided capable of providing a centralized management of file information of shared disks that are distributed in a plurality of computers connected to a network, in which operating conditions for accessing the shared disks can be defined, and thus enabling users to easily share files without being bothered by setting-up, or operations of computers located on the other side when they are to perform file sharing.

Furthermore, according to the present invention, it is possible to provide a storage management integrated system and a storage control method for the storage management integrated system wherein the throughput will not be deteriorated even if access is made to a computer that is liable to be the bottleneck of a network.

The invention claimed is:

1. An integrated storage management system in which access computers each having an auxiliary storage are coupled to each other via a network, said system comprising:
   a plurality of access computers; and
   an integrated storage management server,
   wherein an access computer as the write source sends an inquiry about an access computer as a write destination to be written to the integrated server, said inquiry including file information of a file to be written by the access computer as a write source, wherein said integrated storage management server selects a candidate of said access computers as the write destination to be written and returns said candidate of said access computers to said access computer as the write source, wherein said access computer as the write source selects, when writing the file from the access computer as the write source, an access computer to be used as the write destination to be written which has been returned as the candidate, and writes a file to the access computer as the write destination thus selected as the write destination, wherein said integrated storage management server has policy information which defines a write policy that is used when said access computers are used as an access computer as a write destination, wherein said integrated storage management server uses said policy information and said file information in order to select said candidate of said access computers as the write destination to be written, and wherein said policy information is extracted from policy registration messages received from the access computers used as the write destination to be written.

2. An integrated storage management system as claimed in claim 1, wherein said access computer as the write source selects a candidate of the access computer that has been received from said integrated storage management server, and reports information on the selected access computer as the write destination to be written to said integrated storage management server, and wherein the access computer as the write destination which has been written by said access computer as the write source reports the fact that a write procedure has been initiated to said integrated storage management server.

3. An integrated storage management system as claimed in claim 1, wherein said integrated storage management server retains location information of a file, wherein said access computer as a delete source which deletes a file in said auxiliary storage managed by another access computer designates location information of a file and inquires an access computer as a delete destination which has the deleted file of said integrated storage management server, wherein said integrated storage management server, based on said policy information and said location information of a file, returns a candidate of said access computer as the delete destination which has the deleted file to said access computer as the delete source, and wherein said access computer as the delete source selects an access computer to be used when deleting a file from the access computer as the delete destination which has been returned as the candidate, and deletes a file to the access computer thus selected as the delete destination.

4. An integrated storage management system as claimed in claim 3, wherein location information of a file stored in said auxiliary storage includes information about an integrated storage management server to which an inquiry will be transferred.

5. An integrated storage management system as claimed in claim 3, wherein the access computer as the write or delete destination which has been written or deleted by said access computer as the write or delete source reports the fact that a write or delete procedure has been completed to said integrated storage management server, and wherein said integrated storage management server updates said location information of a file based on the report which is received from said access computer as the write or delete source.

6. An integrated storage management system as claimed in claim 1, wherein said access computer as the write source retains location information of a file, wherein said access computer as the write source, based on said location information of a file, selects an access computer to be used when deleting a file from the access computer as a delete destination which has been returned as the candidate, and deletes a file to the access computer thus selected as the delete destination in case that said access computer as the write source deletes a file in said auxiliary storage managed by another access computer.

7. An integrated storage management system as claimed in claim 1, further comprising proxy access computers as a plurality of said access computers;

wherein said integrated storage management server, when receiving an inquiry from said access computer as the write source, designates and returns a proxy access computer as a candidate for a write destination in addition to said access computer to be written to said access computer as the write source, and wherein said access computer as the write source can, in addition to direct writing a file to said access computer to be written, write a file to said access computer to be written via said proxy access computer.

8. An integrated storage management system as claimed in claim 1, comprising a plurality of said integrated storage management servers, wherein, when said access computer as the write or delete source inquires an access computer to be written or deleted of a first integrated storage management server and if no access computer that corresponds to an access computer managed by said first integrated storage management server exists, said first integrated storage management server transfers such inquiry to a second integrated storage management server, and wherein if an access computer that corresponds to an access computer managed by said second integrated storage management server exists, said second integrated storage management server returns a candidate for said access computer to be written or deleted back to said access computer.

9. An integrated storage management system as claimed in claim 1, wherein said access computer as the delete source selects a candidate of the access computer that has been received from said integrated storage management server, and reports information on the selected access computers as a delete destination to be deleted to said storage integrated management server, and wherein the access computer as the delete destination which has been deleted by said access computer as the delete source reports the fact that a delete procedure has been completed to said integrated storage management server.

10. An integrated storage management system, in which access computers each having an each auxiliary storage are coupled to each other via a network, said system comprising:

a plurality of access computers; and an integrated storage management server, wherein an said access computer as the write source sends an inquiry about an access computer as a write destination to be written to the integrated server, said the inquiry including file information of a file to be written by the access computer as a write source, wherein said integrated storage management server selects a candidate of said access computers as the write destination to be written and returns said candidate of said access computers to said access computer as the write source, wherein said access computer as the write source selects, when writing the file from the access computer as the write source, an access computer to be used as the write destination to be written which has been returned as the candidate, and writes a file to the access computer as the write destination thus selected as the write destination, wherein said integrated storage management server has policy information which defines a write policy that is used when said access computers computer are used as an access computer as a write destination, wherein said integrated storage management server uses said policy information and said file information in order to select said candidate of said access computers as the write destination to be written, and wherein said policy information managed by said integrated storage management server has definitions of a type of computer for indicating whether said access computer is always connected to said integrated management system or not, total available space of the auxiliary storage which is offered to other access computers, available time zone for indicating accessible time for other access computers, and priority of selection of an access computer as a write destination for indicating a degree when said access computer is selected by other access computers as a write source, for respective access computers.

11. A storage management control method of an integrated storage management system in which computers having each auxiliary storage are coupled to each other via a network, said integrated storage management system comprising:

a plurality of access computers; and
an integrated storage management server;
wherein said integrated storage management server has policy information which defines a write policy that is used when said access computers are used as an access computer as a write,
said method comprising:
a step in which said integrated storage management server receives a policy registration message from the access computer as a write destination and extracts said policy information from the policy registration message,
a step in which said access computer as the write source sends an inquiry about an access computer as a write destination to be written to the integrated server, said inquiry including file information of a file to be written by the access computer as a write source,
a step in which said integrated storage management server selects a candidate of said access computers as a write destination to be written to by said access computer as the write source by using said policy information and said file information,
a step in which said integrated storage management server returns said candidate of said access computers as a write destination to be written to said access computer as the write source, and
a step in which said access computer as the write source selects, when writing the file from the access computer as the write source, an access computer to be used as the write destination to be written which has been returned as the candidate, and writes a file to the access computer as the write destination thus selected as the write destination.

12. A storage management control method of an integrated storage management system as claimed in claim 11, further comprising:

a step in which said access computer as the write source selects a candidate of the access computer that has been received from said integrated storage management server, and reports information on the selected access computer as the write destination to be written to said integrated storage management server, and a step in which the access computer as the write destination which has been written by said access computer as the write source reports the fact that a write procedure has been initiated to said integrated storage management server.

13. A storage management control method of an integrated storage management server system as claimed in claim 11, wherein said integrated storage management server retains location information of a file, further comprising:

a step in which said access computer as a delete source which deletes a file in said auxiliary storage managed by another access computer designates location information of a file and inquires an access computer as a delete destination which has the deleted file of said integrated storage management server, a step in which said integrated storage management server, based on said policy information and said location information of a file, returns a candidate of said access computer as the delete destination which has the deleted file to said access computer as the delete source, and a step in which said access computer as the delete source selects an access computer to be used when deleting a file from the access computer as the delete destination which has been returned as the candidate, and deletes a file to the access computer thus selected as the delete destination.

14. A storage management control method of an integrated storage management system as claimed in claim 13, further comprising:

a step in which the access computer as the write or delete destination which has been written or deleted by said access computer as the write or delete source reports the fact that a write or delete procedure has been completed to said integrated storage management server, and a step in which said integrated storage management server updates said location information of a file based on the report which is received from said access computer as the write or delete source.

15. A storage management control method of an integrated storage management system as claimed in claim 11, wherein said access computer as the write source retains location information of a file further comprising:

a step in which said access computer as the write source, based on said location information of a file, selects an access computer to be used when deleting a file from the access computer as a delete destination which has been returned as the candidate, and deletes a file to the access computer thus selected as the delete destination in case that said access computer as the write source deletes a file in said auxiliary storage managed by another access computer.

16. A storage management control method of an integrated storage management system as claimed in claim 11, wherein said integrated storage management system further comprises proxy access computers as a plurality of said access computers;

wherein said integrated storage management server, when receiving an inquiry from said access computer as the write source, designates and returns a proxy access computer as a candidate for a write destination in addition to said access computer to be written to said access computer as the write source, and wherein said access computer as the write source can, in addition to direct writing a file to said access computer to be written, write a file to said access computer to be written via said proxy access computer.

17. A storage management control method of an integrated storage management system as claimed in claim 11, wherein said system comprises a plurality of said integrated storage management servers;

wherein, when said access computer as the write or delete source inquires an access computer to be written or deleted of a first integrated storage management and if no access computer that corresponds to an access computer managed by said first integrated storage management exists, said first integrated storage management transfers such inquiry to a second integrated storage management server, and wherein if an access computer that corresponds to an access computer managed by said second integrated storage management server exists, said second integrated storage management server returns a candidate for said access computer to be written or deleted back to said access computer.

18. A storage management control method of an integrated storage management system as claimed in claim 11, wherein location information of a file stored in said auxiliary storage includes information about an integrated storage management server to which an inquiry will be transferred.

19. A storage management control method of an integrated storage management system as claimed in claim 11, further comprising:

a step in which said access computer as the delete source selects a candidate of the access computer that has been received from said integrated storage management server, and reports information on the selected access computers as a delete destination to be deleted to said integrated storage management server, and a step in which the access computer as the delete destination which has been deleted by said access computer as the delete source reports the fact that a delete procedure has been completed to said integrated storage management.

20. A storage management control method of an integrated storage management system in which computers having each auxiliary storage are coupled to each other via a network, said integrated storage management system comprising:

a plurality of access computers; and an integrated storage management server;

wherein said integrated storage management server has policy information which defines a write policy that is used when said access computers are used as an access computer as a write;

said method comprising:

a step in which said access computer as the write source sends an inquiry about an access computer as a write destination to be written to the integrated server, said inquiry including file information of a file to be written by the access computer as a write source, a step in which said integrated storage management server selects a candidate of said access computers as a write destination to be written to by said access computer as the write source by using said policy information and said file information, a step in which said integrated storage management server returns said candidate of said access computers as a write destination to be written to said access computer as the write source, and a step in which said access computer as the write source selects, when writing the file from the access computer as the write source, an access computer to be used as the write destination to be written which has been returned as the candidate, and writes a file to the access computer as the write destination thus selected as the write destination, wherein said policy information managed by said integrated storage management server has definitions of a type of computer for indicating whether said access computer is always connected to said integrated management system or not, total available space of the auxiliary storage which is offered to other access computers, available time zone for indicating accessible time for other access computers, and priority of selection of an access computer as a write destination for indicating a degree when said access computer is selected by other access computers as a write source, for respective access computers.

* * * * *